(12) United States Patent
Klappert et al.

(10) Patent No.: US 9,424,584 B2
(45) Date of Patent: Aug. 23, 2016

(54) SYSTEMS AND METHODS FOR GENERATING AND DISPLAYING USER PREFERENCE TAG CLOUDS

(75) Inventors: Walter R. Klappert, Los Angeles, CA (US); Michael R. Nichols, La Canada-Flintridge, CA (US)

(73) Assignee: Rovi Guides, Inc., San Carlos, CA (US)

( * ) Notice: Subject to any disclaimer, the term of this patent is extended or adjusted under 35 U.S.C. 154(b) by 311 days.

(21) Appl. No.: 13/170,633

(22) Filed: Jun. 28, 2011

(65) Prior Publication Data
US 2013/0007661 A1 Jan. 3, 2013

(51) Int. Cl.
*G06F 3/048* (2013.01)
*G06Q 30/02* (2012.01)
*G06F 17/21* (2006.01)
*G06F 3/0481* (2013.01)
*G06F 17/30* (2006.01)

(52) U.S. Cl.
CPC .............. *G06Q 30/02* (2013.01); *G06F 3/0481* (2013.01); *G06F 17/211* (2013.01); *G06F 17/30719* (2013.01); *G06F 17/30722* (2013.01)

(58) Field of Classification Search
CPC ........... G06F 17/211; G06F 17/30719; G06F 17/30722
USPC .......................................... 715/811; 345/619
See application file for complete search history.

(56) References Cited

U.S. PATENT DOCUMENTS

| | | | | |
|---|---|---|---|---|
| 2,583,494 A * | 1/1952 | Rilling | .................... | G09B 17/00 434/159 |
| 5,306,006 A * | 4/1994 | Bell | ...................... | A61F 9/0098 273/156 |
| 5,606,658 A * | 2/1997 | Hirono | ...................... | B41J 3/01 345/471 |
| 5,845,303 A * | 12/1998 | Templeman | .......... | G06F 17/248 715/255 |
| 6,826,727 B1 * | 11/2004 | Mohr | .................... | G06F 17/211 382/180 |
| 7,384,667 B2 * | 6/2008 | Blanco | .................... | B44F 11/02 345/419 |
| 8,280,357 B2 * | 10/2012 | Eisinger | ................. | G06F 21/10 455/411 |
| 8,289,342 B2 * | 10/2012 | Matsumoto | ............ | G06T 5/003 345/156 |
| 8,786,889 B2 * | 7/2014 | Park | ....................... | G09G 5/006 345/156 |
| 8,928,929 B2 * | 1/2015 | Park | ...................... | G06F 17/214 235/375 |
| 2004/0095359 A1 * | 5/2004 | Simon | ..................... | G06T 11/60 345/619 |
| 2004/0205602 A1 * | 10/2004 | Croeni | ......................... | 715/517 |
| 2006/0212801 A1 * | 9/2006 | Berker | ................. | G06F 17/211 715/202 |
| 2007/0234205 A1 * | 10/2007 | Lloyd | ..................... | G06T 11/60 715/209 |
| 2008/0187279 A1 * | 8/2008 | Gilley et al. | ..................... | 386/52 |
| 2008/0222105 A1 * | 9/2008 | Matheny | .......................... | 707/3 |
| 2009/0287989 A1 * | 11/2009 | Chakra et al. | ................. | 715/205 |
| 2009/0299725 A1 * | 12/2009 | Grigsby et al. | ..................... | 704/2 |
| 2009/0307219 A1 * | 12/2009 | Bennett | ............. | G06F 17/30277 |

(Continued)

OTHER PUBLICATIONS

Create Type Within a Shape in Photoshop by Jenifer Farley (Sitepoint.com Sep. 23, 2009) (Farley).*

(Continued)

*Primary Examiner* — William Bashore
*Assistant Examiner* — Nathan Shrewsbury
(74) *Attorney, Agent, or Firm* — Ropes & Gray LLP

(57) ABSTRACT

Systems and methods for generating and displaying user preferences in a tag cloud are provided in accordance with various embodiments of the present invention. A user preference tag cloud may be of any shape and size and may be generated using a stencil selected by a user. A user preference tag cloud may thus present a user's media preferences in an attractive and compelling visual arrangement that, in some embodiments, also functions as an intuitive interface which allows users to indicate and/or modify their preferences.

18 Claims, 15 Drawing Sheets

(56) References Cited

U.S. PATENT DOCUMENTS

| | | | | |
|---|---|---|---|---|
| 2010/0161619 A1* | 6/2010 | Lamere | ............... | G06Q 10/00 707/749 |
| 2010/0269067 A1* | 10/2010 | De Bel Air et al. | ......... | 715/811 |
| 2011/0035705 A1* | 2/2011 | Faenger | ........... | G06F 17/30053 715/811 |
| 2011/0169757 A1* | 7/2011 | Kiddle et al. | ................ | 345/173 |
| 2011/0214050 A1* | 9/2011 | Stambaugh | .................. | 715/234 |
| 2011/0270947 A1* | 11/2011 | Cok | ................. | G06Q 30/0601 709/217 |
| 2012/0054666 A1* | 3/2012 | Baird-Smith | ......... | G06Q 10/10 715/780 |
| 2012/0151397 A1* | 6/2012 | Oberstein | ........ | G06Q 17/30126 715/769 |
| 2012/0151521 A1* | 6/2012 | Gilley | ................... | G06Q 30/02 725/32 |
| 2013/0173533 A1* | 7/2013 | Nichols | ............ | G06F 17/30035 707/609 |

OTHER PUBLICATIONS

Photoshop: Converting Raster Images to Custom Shapes posted at vagpod.wordpress.com (Feb. 5, 2008) (Vagpod).*

* cited by examiner

400

Mystery Adventure *Musical* Art Regional Family *Drama* Jazz Reggae *Action Fantasy* Pop Hip-Hop *Thriller* *Crime* Rock Folk *Sport War* Country Punk Suspense *Documentary* *Western* Blues Comedy Heavy-Metal *Science Fiction* Electronic *Romance*

TRADITIONAL:
| | | |
|---|---|---|
| 3D Pinball | Card Game | 2D Pinball |

PUZZLE:
| | | |
|---|---|---|
| Action Puzzle | Adventure Puzzle | Maze Puzzle |

SIMULATION:
| | | |
|---|---|---|
| Musical Instrument/Band Sim | Dancing Sim | Flight Sim |

RACING:
| | |
|---|---|
| Kart Racing | Sports Car Racing |

ADVENTURE:
| | |
|---|---|
| Action/RPG Adventure | Made 1 lower by user |

ROLE-PLAYING:
| | | |
|---|---|---|
| First-Person Action RPG | Isometric Action RPG | Persistent World Online RPG |

ACTION:
| | | |
|---|---|---|
| Side-Scrolling Platform | 3D Action | Party |

SPORTS:
| | | |
|---|---|---|
| Billiards | Football (American) | Horse Racing |
| Bowling | Skiing | Golf |

HOME:
| | | |
|---|---|---|
| Genealogy | Movies/Music | Personal Management |
| Home Design/Improvement | | |

SHOOTER:
| | | |
|---|---|---|
| Puzzle Shooter | Side-Scrolling Shooter | First-Person Shooter |

STRATEGY:
| | | |
|---|---|---|
| 3D Turn-Based Strategy | Card Battle | Persistent World Online RTS |

EDUCATIONAL:
| | |
|---|---|
| Quiz Game | Language |

FIGHTING:

X/ADULT:

FIG. 11

SYSTEMS AND METHODS FOR GENERATING AND DISPLAYING USER PREFERENCE TAG CLOUDS

BACKGROUND OF THE INVENTION

Modern day consumers are confronted with numerous entertainment options and an immeasurable amount of available media content. Thousands of videos, songs, and articles are available to users through the Internet, television, and other gateways to media content. In such an environment, recommendation engines that suggest content to users have taken on increasing importance. Examples include media guidance applications and web sites that recommend movies, books, and other content to users based on user preference information.

Traditional systems often monitor a user's behavior (e.g., ongoing media selections) to gather preference information. Of course, another preferred source of user preference data is the user herself. Traditional systems sometimes allow a user to specify preference information directly, e.g., by filling out a questionnaire. However, new techniques for displaying user preference information and for receiving such information directly from a user remain highly desirable.

SUMMARY OF THE INVENTION

Accordingly, systems and methods for generating and displaying user preferences in a tag cloud are provided in accordance with various embodiments of the present invention. A user preference tag cloud may present a user's media preferences in an attractive and compelling visual arrangement that, in some embodiments, also functions as an intuitive interface which allows users to indicate and/or modify their preferences.

In some embodiments, user profile information is retrieved from a database. The user profile information may include media content attributes, which define a user's tastes in media content. A stencil that defines a shape and a size of a text area may then be identified. For example, a user selection of a stencil may be received or a stencil may be located automatically. In some embodiments, a user selection of an image may be received and the stencil is extracted from the image. Using the user profile information and the stencil, a user preference tag cloud may be generated. The user preference tag cloud includes one or more of the media content attributes, and the media content attributes may be arranged within the text area based on the shape and the size of the text area, as defined by the stencil.

In one approach, each of the media content attributes has an associated media content category, and the user preference tag cloud is generated, in part, by rendering each of the media content attributes in a font characteristic indicative of its associated media content category. In another approach, each of the media content attributes has an associated weighting factor, and the user preference tag cloud is generated, in part, by rendering each of the media content attributes in a font characteristic indicative of its associated weighting factor. These two approaches may also be combined such that the user preference tag cloud is generated, in part, by rendering each of the media content attributes in one or more font characteristics indicative of its associated media content category and weighting factor.

A font characteristic, as used herein, refers to one or more of a font size, font face, font style, a foreground or background color, a highlight, a border, or any other suitable display attribute applicable to text. Accordingly, in one embodiment, each of the media content attributes of the user preference tag cloud is rendered in a font size proportional to its associated weighting factor.

In some embodiments, a user indication to resize one of the media content attributes may be received. The indication may include a scale factor, i.e., the user's indication may specify a degree of resizing. For example, the user may select a media content attribute within the tag cloud and drag a corner of a border surrounding the attribute to resize it. The media content attribute may accordingly be rendered in a font size proportional to the scale factor. In addition, the weighting factor associated with that media content attribute may be updated based on the scale factor. For example, the weighting factor may be adjusted in proportion to the scale factor and stored back in the user profile information. In some embodiments, the font size of other media content attributes in the tag cloud may be increased or reduced based on the scale factor, e.g., to accommodate the user-resized attribute.

In some embodiments, a plurality of media listings are searched to identify media content that matches one or more of the media content attributes within the user preference tag cloud. For example, the media listings may include attributes that can be compared to the media content attributes within the user preference tag cloud. In one approach, the best matching media content is determined. This determination may be based on the weighting factors assigned to the media content attributes. For instance, media content matching media content attributes with large weighting factors may be prioritized over media content matching media content attributes with low weighting factors. At least one of the media listings may be displayed in a display screen (e.g., of a media guidance application) in response to the determination.

In some embodiments, a user indication to add or remove one of the media content attributes from the user preference tag cloud may be received. The user preference tag cloud may be modified in response to the user indication, e.g., so that the media content attribute appears or is removed from the tag cloud, respectively. Furthermore, the user profile information may be updated based on the user indication, e.g., to add or remove the media content attribute from the user profile information.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 4 illustrates an exemplary tag cloud in accordance with some embodiments of the present invention;

FIG. 11 illustrates an exemplary display screen that presents a category detail table in accordance with some embodiments of the present invention;

DETAILED DESCRIPTION OF THE VARIOUS EMBODIMENTS

Figure 1:
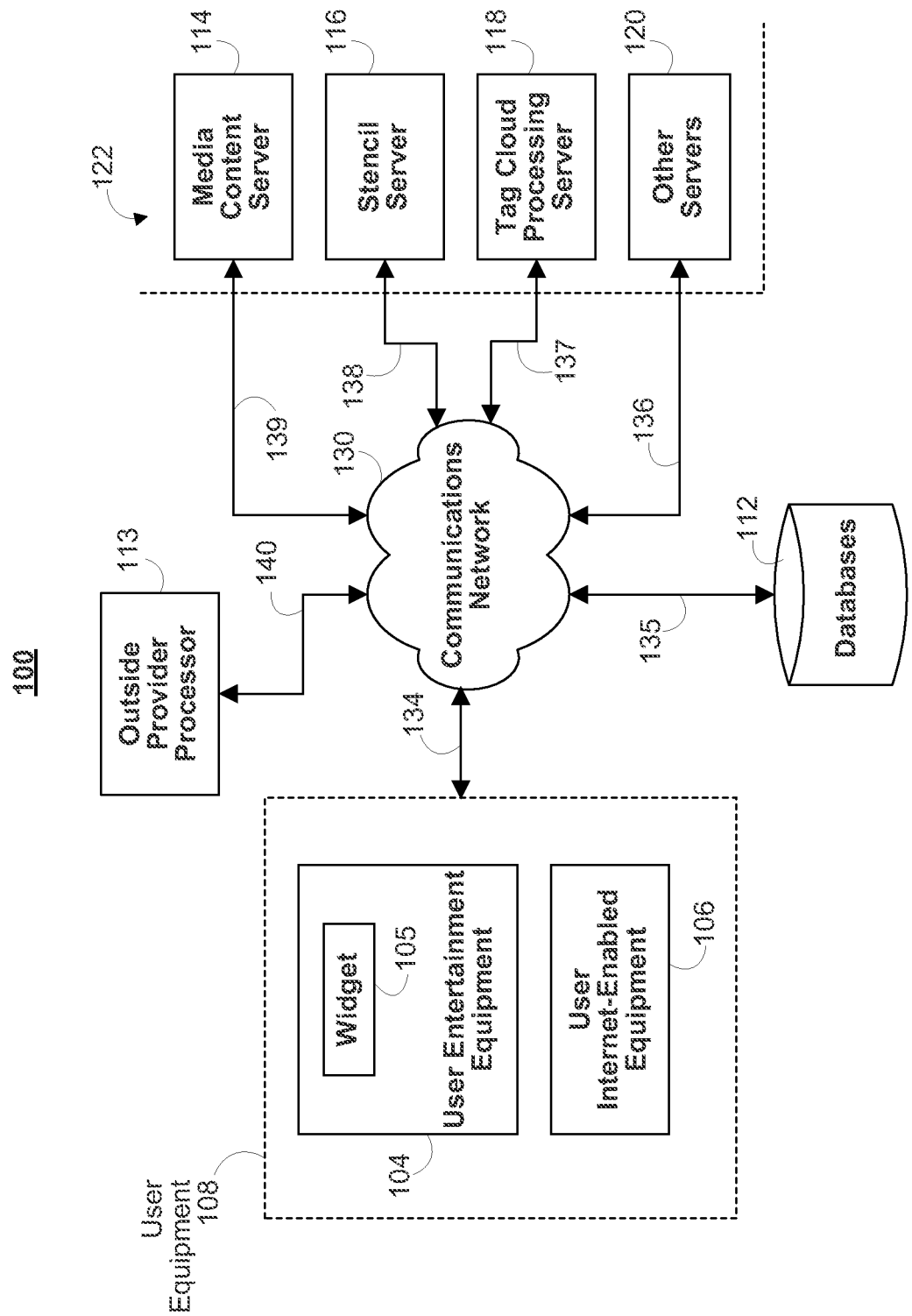
FIG. 1 illustrates an example of a system for generating and/or displaying a user preference tag cloud in accordance with some embodiments of the present invention.

A tag cloud is a collection of words associated with a central subject where the words vary in size, color, background, style or other font characteristic based on the relationship between each word and the central subject. For example, each word in a tag cloud may be sized in accordance with its degree of importance or relevance to the central subject. Tag clouds are therefore useful as a means of presenting information related to user preferences in a media guidance application, web site, or other graphical user interface. When employed for this purpose, a tag cloud may include attributes defining a user's interest (e.g., taste) in media categories such as television, movies, music, games, books, etc. Attributes reflective of a user's media content preferences are referred to herein as media content attributes or, simply, attributes. Such media content attributes may be stored in a user preference profile (i.e., user profile). A tag cloud made up of various media content attributes is referred to herein as a user preference tag cloud.

The degree of interest a user has in a particular media content attribute may be reflected in a user preference tag cloud by varying a color or other font characteristic of that attribute. For example, the bigger the size of an attribute the more desirable that attribute may be to the user. The category to which an attribute belongs may also be reflected in a user preference tag cloud through use of font characteristics. For example, attributes defining movies, music, and games of interest to the user may be presented in three different colors, respectively. In addition, recently added attributes may be emphasized using yet another font characteristic, e.g., by highlighting that attribute in the tag cloud. It should be understood that any number of font characteristics may be used to convey information about an attribute.

Accordingly, user preference tag clouds can be used to present preference information to users in a compelling and efficient manner. Specifically, a user may be presented with a visually attractive tag cloud that conveys layers of information about attributes of media categories the user is particularly interested in (e.g., by displaying the attributes in a size indicative of their importance to the user and in a color that indicates their associated media content category). These tag clouds may update to reflect the latest user preferences and/or may be directly modified by the user, as discussed below in greater detail.

User preference tag clouds may be displayed to a user using any suitable graphical user interface (e.g., on a web site, in a software application, in a display screen of a media guidance application, on an e-book reader screen, etc.). A user preference tag cloud may be stored and/or displayed as an image file, text file, or any other suitable data file or record. In some embodiments, a user preference tag cloud may be displayed by, or as part of, a widget.

Widgets are applications (i.e., collections of instructions executable by a processor) that provide information from the Internet and/or otherwise remotely accessible servers (hereinafter "remote servers") to a user. A widget may provide this information through web services and/or using any suitable communication protocol (e.g., TCP/IP, IPTV, etc.). Widgets may also perform local processing tasks, such as generating user preference tag clouds, and may also control display features of user equipment, such as hardware and software tasks involved in displaying user preference tag clouds. These widget capabilities, as well as additional widget functionality, will be described in greater detail below.

A widget may run on a television, user equipment associated with a television, and/or other user equipment capable of providing media to a user (e.g., a mobile phone, e-reader, camera, or video player). Television widgets are widgets that run strictly on the hardware platform (e.g., control circuitry) of a television. Typically, television widgets have limited interactions with external user equipment and databases, such as set-top boxes and third party servers. It will be understood that where the below description refers to a widget or widgets, the term is inclusive of television widgets and other applications with widget-type functionality. For example, a widget may be or include a JAVA applet executable on a mobile device. JAVA is a registered trademark owned by Sun Microsystems, Inc. More generally, a widget may be, include, or be part of an application, a software module, or other suitable set of computer-readable instructions. A widget may also be referred to, in some instances, as an "app."

In accordance with an embodiment of the present invention, a widget may be used to generate and/or display a user preference tag cloud. For example, a widget running on a television or set-top box may generate and/or display the user preference tag cloud in a display screen of a media guidance application. The widget may accordingly access user profile information and/or stencils, as discussed in greater detail below.

FIG. 1 illustrates an example of a system 100 for generating and/or displaying a user preference tag cloud in accordance with some embodiments of the present invention. System 100 may include user equipment 108, which may include one or both of user entertainment equipment 104 and user internet-enabled equipment 106. User entertainment equipment 104 may include user television equipment, user computer equipment, a wireless user communication device, an e-reader, a set-top box, or any other type of user entertainment equipment for accessing media, such as a non-portable or portable gaming machine. User internet-enabled equipment 106 may include a set-top box, an integrated receiver decoder (IRD) for handling satellite television, a PC, a laptop, a tablet, an e-reader, a WebTV box, a personal computer television (PC/TV), a PC media server, a PC media center, a television set, a digital storage device, a DVD recorder, a video-cassette recorder (VCR), a local media server, wireless user communications devices, or any other suitable internet-enabled equipment. WEBTV is a trademark owned by Microsoft Corp. Wireless communications devices may include PDAs, a mobile telephone, a smartphone, a portable music player, a portable gaming machine, or other wireless devices.

In system 100, there is typically more than one of each type of user equipment device but only one of each is shown in FIG. 1 to avoid overcomplicating the drawing. In addition, a user may utilize more than one type of user equipment device (e.g., a user may have a television set and a computer) and also more than one of each type of user equipment device (e.g., a user may have a PDA and a mobile telephone and/or multiple television sets).

It should be noted that with the advent of television tuner cards for PC's, WebTV, and the integration of video into other user equipment devices (e.g., mobile phones), the lines have become blurred when trying to classify a device as a user entertainment device or a user internet-enabled device. Each of user equipment 108 may utilize at least some of the system features described below with respect to FIG. 2 and, as a result, include flexibility with respect to the type of interactive applications available on the device. For example, user entertainment equipment 104 may be internet-enabled allowing for access to information through the Internet, while user internet-enabled equipment 106 may include a tuner allowing for access to television programming. It should therefore be understood that, in some embodiments, user entertainment equipment 104 and user internet-enabled equipment 106 are integrated components of a single user device (i.e., user equipment 108).

In some embodiments, system 100 includes widget 105. Widget 105 may be resident in user entertainment equipment 104 within user equipment 108. Alternatively, widget 105 may be resident in user internet-enabled equipment 106 within user equipment 108. In still other embodiments, widget 105 may run on user internet-enabled equipment 106 in addition to user entertainment equipment 104.

Widget 105 may be a software application that is downloaded or installed, for instance, in user entertainment equipment 104. Widget 105 may be executed by an interpreter or virtual machine running, for example, on control circuitry of user entertainment equipment 104 (e.g., control circuitry 204 of FIG. 2). Widget 105 may allow users to interact with web services while watching television or other video programs on user entertainment equipment 104. In some embodiments, widget 105 may run on the Yahoo! Connected TV platform, and user entertainment equipment 104 may be a television manufactured with built-in support for widget 105 (e.g., from one of Samsung Group, Sony Group, LG Electronics, or Vizio).

Figure 2:
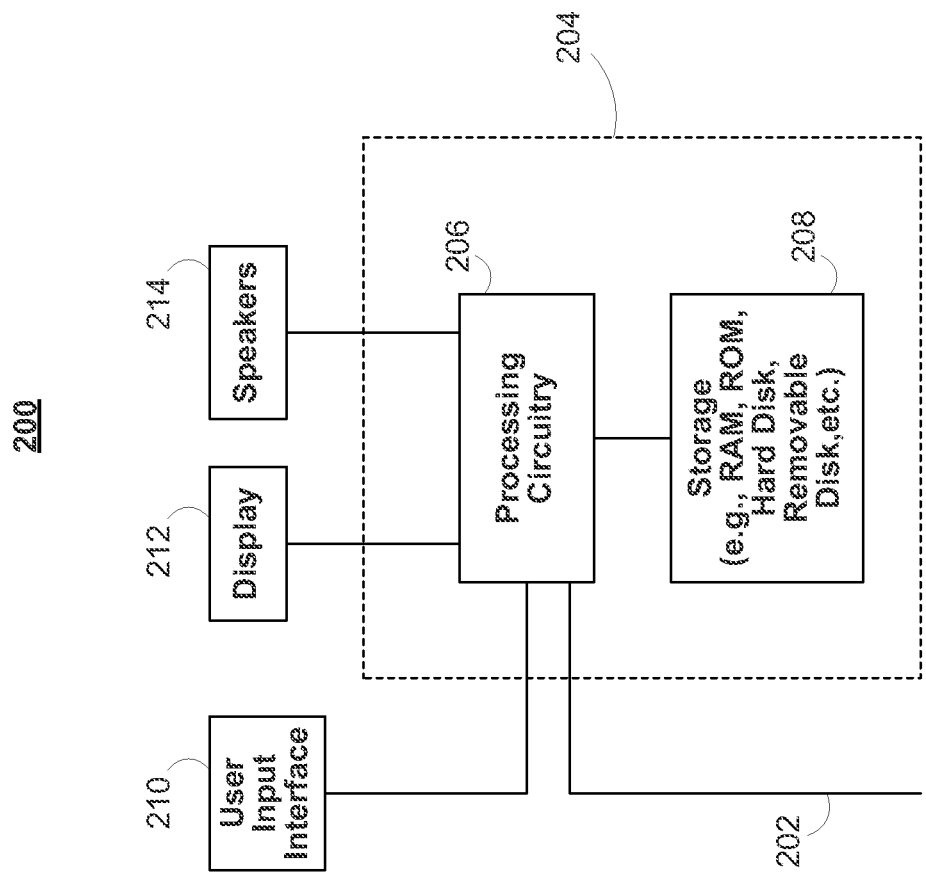
FIG. 2 illustrates an example of a user equipment device in accordance with some embodiments of the present invention.

In some embodiments, widget 105 may be one of several widgets that make up an application packaged and/or encoded in the ETV Binary Interchange Format (EBIF), received by control circuitry 204 of FIG. 2 as part of a suitable feed, and interpreted by a user agent running on control circuitry 204. For example, widget 105 may be part of an EBIF application and user entertainment equipment 104 may be a set-top box. In other embodiments, the widget may be defined by one or more JAVA-based files that are received and run by a local virtual machine or other suitable middleware executed by control circuitry 204 of FIG. 2. In yet other embodiments (e.g., those employing MPEG-2 or other digital media encoding schemes), the widget may be encoded and transmitted in an MPEG-2 object carousel with the MPEG audio and video packets of a program. In this embodiment, widget 105 may be part of an OpenCable Application Platform (OCAP) application (e.g., a tru2way application), and user entertainment equipment 104 may be a set-top box.

Widget 105 may have the same display layout and/or execution parameters on various types of user equipment or may be tailored to the display and/or processing capabilities of the user equipment. For example, on user entertainment equipment 104, widget 105 may run as a persistent (e.g., always-running) application. In another example, the widget display screens may be scaled down for wireless user communications devices.

In some embodiments, user equipment 108 may access and/or run a media guidance application that provides an interface that allows users to efficiently navigate through media selections and easily identify media content that they may desire. Media guidance applications may take various forms depending on the media for which they provide guidance. One typical type of media guidance application is an interactive television program guide. Interactive television program guides (sometimes referred to as electronic program guides or EPGs) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), recorded programs, and other types of media content (e.g., audio content). Moreover, media guidance applications allow users to navigate among and locate content related to the media content for which guidance is provided including, for example, video clips, audio assets, articles, advertisements, chat sessions, games, etc. Media guidance applications may be provided as on-line applications (i.e., provided on a website), or as stand-alone applications or clients.

In accordance with some embodiments of the present invention, a user preference tag cloud may be generated and/or displayed by a widget, media guidance application, or other suitable software application running on a user device (e.g., user equipment 108) and/or an external server (e.g., servers 122).

In some embodiments, the user may enter user profile information into user equipment 108. The user profile information may be stored within user equipment 108 (e.g., storage 208 of FIG. 2) or in a remote data store (e.g., one of databases 112). The user profile information may be used and maintained across in-home devices and remote devices. For example, if a user indicates a certain television show as a favorite on, for example, the web site www.tvguide.com on their personal computer at their office, the same show would appear as a favorite on the user's in-home devices (e.g., in a media guidance application running on user entertainment equipment 104). Therefore, changes in the user profile made on one user equipment device can change the user's experience on another user equipment device, regardless of whether they are the same or a different type of user equipment device. In addition, the changes made may be based on information input by a user, as well as monitored user activity.

In some embodiments, user profile information may include data from monitoring a user's activity. For example, user interaction with widget 105, a media guidance application, and/or any other suitable application or feature (e.g., running on or displayed by user equipment 108) may be monitored and recorded. User profile information may also include user-identifying information (e.g., the user's name), user viewing habits, user demographic information, or any other suitable data relating to and/or describing a user. User profile information may be stored within user equipment 108 and/or at a remote location (e.g., databases 112).

In some embodiments, user profile information includes attributes for one or more categories of media content that are of interest to the user (i.e., media content attributes). Media content categories include television shows, movies, music, books, articles, games, etc. Attributes may be specific to the media content category and may specify genre, actor, artist, theme, title, length, etc. For example, user profile information may include the following media content attributes: sitcoms (television), documentaries (movies), and country (music). In one approach, the user profile includes a listing of each attribute and its associated category. In another approach, each attribute is categorized according to its associated category. The user profile may include only those media content attributes in each category that are of interest to the user. Alternatively, the user profile may include all available media content attributes for each category and an indication of user interest may be associated with each attribute. For example, in an embodiment, each attribute is associated with a priority and/or weighting, as discussed in greater detail below.

In an embodiment, media content attributes may be extracted from user monitoring data. For example, attributes may be extracted from television shows the user previously viewed or selected. Techniques for identifying attributes of media content and searching for related content on that basis are described in greater detail in Herrington et al. U.S. Pat. No. 6,865,746, issued Mar. 8, 2005, which is hereby incorporated by reference herein in its entirety. In another embodiment, attributes may be retrieved from a social networking service or other external server. Attributes may also be directly input by the user.

The user equipment devices of user equipment 108 may be coupled to communications network 130 using communications path 134. Communications network 130 may be one or more networks including a local area network, a wide area network, the Internet, a mobile phone network, mobile device (e.g., Blackberry) network, cable network, public switched telephone network, or other types of communications networks. BLACKBERRY is a service mark owned by Research In Motion Limited, Corp. Paths 134-140 may separately or together include one or more communications paths, such as, a satellite path, a fiber-optic path, a cable path, a path that supports Internet communications (e.g., TCP/IP, IPTV, etc.), free-space connections (e.g., for broadcast or other wireless signals), or any other suitable wired or wireless communications path or combination of such paths. Communications with the user equipment devices may be provided by one or more of these communications paths, but are shown as single paths in FIG. 1 to avoid overcomplicating the drawing.

Although communications paths are not drawn between user equipment devices 104 and 106, these devices may communicate directly with each other through communications network 130 and/or via short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other indirectly, e.g., through an indirect path via communications network 130.

When a user preference tag cloud is to be displayed on user equipment 108, widget 105 may be invoked to generate and/or display the tag cloud. In some embodiments, widget 105 is invoked expressly by the user, for instance, in response to an indication or selection received from the user (e.g., via user input interface 210 of FIG. 2). In other embodiments, widget 105 is invoked automatically, for example, upon display of a media guidance display screen. In response to invocation, widget 105 may send information to outside provider processor 113 (hereinafter "OPP 113") over communications network 130 (including, e.g., paths 134 and 140). In some embodiments, communications with OPP 113 may be exchanged over one or more communications paths, but are shown as two separate paths in FIG. 1 to avoid overcomplicating the drawing. In addition, there may be more than one outside provider processor, but only OPP 113 is shown in FIG. 1 to avoid overcomplicating the drawing.

OPP 113 may be provided by a service provider, which may be the originator of media content, e.g., a television or internet broadcaster, a Webcast or streaming video provider, a digital cable service provider, a bundled communication (e.g., Internet, telephone, and TV) provider such as Verizon FiOS, a provider of digital on-demand media, a cellular telephone service provider, etc. Alternatively, the service provider may not be the originator of media content, e.g., an on-demand media content provider, an Internet provider of video content of broadcast programs for downloading or streaming, etc. A service provider may include cable sources, satellite providers, on-demand providers, Internet providers, or other providers of media content. A service provider may also include a remote media server used to store different types of media content in a location remote from any of the user equipment devices. As used herein, the term broadcaster may refer to an analog or digital signal provider, a cable network, a satellite provider, an Internet website, an Internet content provider, or any such provider that may distribute media content such as video assets to user equipment or user equipment devices. As used herein, the terms broadcaster's website or media broadcaster's website may refer to one or many web addresses, server addresses, databases, or other sources of media information or media content, specific to a particular broadcaster, and associated with Internet websites or other content providers. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

OPP 113 may include a data processor (e.g., any suitable computer server equipment) operated by an outside provider that can act as a central hub for communications between widget 105 running on user equipment 108 and third party servers 122. OPP 113 may also be implemented as a set of servers located in one or more regional areas, such that OPP 113 represents what has become knows as "the cloud." As will be discussed, third party servers 122 may include media content server 114, stencil server 116, tag cloud processing server 118, and other servers 120. In some embodiments, OPP 113 may store and retrieve information from databases 112. Databases 112 may be any suitable computer server equipment and/or any suitable data storage device.

Media content server 114 may broadcast or otherwise transmit media content to user equipment 108. The media content may be transmitted at a scheduled time or in response to a request, e.g., as video-on-demand (VOD). In one approach, the media content may be delivered to user equipment 108 over-the-top (OTT) using broadband services. A set-top box or other processing circuitry in user equipment 108 may decode the media content and output the media content in one or more formats. For example, media content may be received by a set-top box in a standard web format (e.g., MPEG, FLASH, H.264, Ogg, etc.) and converted into a standard television signal for display on a television screen. In this approach, even vintage television sets may display web-originated video.

Media content server 114 may also provide media guidance data, such as media listings, media-related information and attributes (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips or segments, etc.), on-demand information, and any other type of guidance data that is helpful for a user to navigate among and locate desired media selections.

Media content server 114 may include any suitable computer server equipment capable of broadcasting or delivering media content and related information. Such servers may include traditional head-ends, such as television broadcast stations, and may include internet servers configured to deliver content upon request (e.g., on-demand, streaming content, downloadable content). For example, a media content server may be one belonging to Hulu, Netflix, Apple, or Amazon.com. In some embodiments, media content server 114 may send inventory and other information to OPP 113 via communications network 130. For example, media content server 114 may send OPP 113 information regarding media content available via video-on-demand or digital download. The inventory information may be provided, for example, to a media guidance application on user equipment 108.

Stencil server 116 may include any suitable computer server equipment capable of providing stencils to user equipment 108 and/or OPP 113. Stencils are outlines of figures or images that are used to create tag clouds by defining the dimensions and shape of an area to be populated by text (i.e., media content attributes). Stencil server 116 may communicate with databases 112 to retrieve user profile information and other relevant data for stencil selection. Alternatively, user information may be provided to stencil server 116 from OPP 113 or widget 105. Stencil server 116 may be, in some embodiments, a repository of user images. These images may be associated with identifying information that may substantially match user information. Stencil server 116 may alternatively be an internet server such as that belonging to a social networking service (e.g., Facebook). A social networking service may provide profile pictures of users that may be retrieved using user information. Other images may also be accessible that match user information, or that are associated with user information (e.g., pictures of the user's friends). In some embodiments, stencil server 116 is the same server as media content server 114 and/or tag cloud processing server 118.

In an embodiment, stencil server 116 is capable of processing an image to extract an outline of the contents of the image. This outline may be stored as a stencil (which may be another image file). Generating and providing stencils is discussed in greater detail below in connection with FIGS. 13A and 13B.

Tag cloud processing server 118 may include any suitable computer server equipment capable of processing stencils and/or user profile information. Processing may include digital image processing, text processing, and/or any other sort of digital content manipulation. The processing features of tag cloud processing server 118 may be implemented in hardware, software, or both. Processing stencils and user profile information may include altering the geometrical properties of the stencil, identifying attributes within the profile information, and arranging text (i.e., the attributes) within the stencil. These and other processing features are discussed below in greater detail, e.g., in connection with FIGS. 14, 15A and 15B.

Other servers 120 may include any suitable computer server equipment not mentioned in the description above. For example, other servers 120 may include image or video processing web sites or applications. In some embodiments, other servers 120 may transmit information to OPP 113 or to user equipment 108 via network 130.

FIG. 2 illustrates an example of generalized user equipment 200 in accordance with some embodiments of the present invention. User equipment 200 may be substantially the same as, or may be comprised within, user equipment 108 of FIG. 1. In one approach, user equipment device 200 may receive and send information to and from OPP 113 or servers 122 (FIG. 1) via input/output (hereinafter "I/O") path 202. I/O path 202 may provide data to control circuitry 204, which may include processing circuitry 206 and storage 208. I/O path 202 may connect control circuitry 204 (and specifically processing circuitry 206) to communications network 130 of FIG. 1. I/O functions may be provided by one or more communication paths, but are shown as a single path in FIG. 2 to avoid overcomplicating the drawing.

Control circuitry 204 may include any suitable processing circuitry 206 such as processing circuitry based on one or more microprocessors, microcontrollers, digital signal processors, programmable logic devices, etc. In some embodiments, control circuitry 204 executes instructions for widget 105 (FIG. 1) and/or other applications stored in memory (i.e., storage 208). In client-server based embodiments, control circuitry 204 may include communications circuitry suitable for communicating with networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (described in more detail in connection with FIG. 1). In addition, communications circuitry may include circuitry that enables peer-to-peer communication between user equipment devices, or communication between user equipment devices located remotely from each other (described in more detail in connection with FIG. 1).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 208 that is part of control circuitry 204. Storage 208 may include one or more of the above types of storage devices. For example, user equipment device 200 may include a hard drive for a DVR (sometimes called a personal video recorder, or PVR) and a DVD recorder as a secondary storage device. Storage 208 may be used to store various types of media and data described herein, including program information, widget settings, user preferences or profile information, media elements, video assets, or data used in operating widget 105. Nonvolatile memory may also be used (e.g., to launch a boot-up routine and other instructions).

Control circuitry 204 may include video generating circuitry and tuning circuitry, such as one or more analog tuners, one or more MPEG-2 decoders or other digital decoding circuitry, high-definition tuners, or any other suitable tuning or video circuits or combinations of such circuits. For example, control circuitry may include a display driver for driving display 212. Encoding circuitry (e.g., for converting over-the-air, analog, or digital signals to MPEG signals for storage) may also be provided. Control circuitry 204 may also include scaler circuitry for upconverting and downconverting media into the preferred output format of the user equipment 200. Control circuitry 204 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive data for widget 105. The circuitry described herein, including for example, the tuning, video generating, encoding, decoding, scaler, switching, display driver, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc). If storage 208 is provided as a separate device from user equipment device 200, the tuning and encoding circuitry (including multiple tuners) may be associated with storage 208.

A user may issue commands to the control circuitry 204 using user input interface 210. User input interface 210 may be any suitable user interface, such as a remote control, mouse, trackball, keypad, keyboard, touch screen, touch pad, stylus input, joystick, voice recognition interface, or other user input interfaces. Display 212 may be provided as a stand-alone device or integrated with other elements of user equipment device 200. Display 212 may be one or more of a monitor, a television, a liquid crystal display (LCD) for a mobile device, or any other suitable equipment for displaying visual images (e.g., an e-ink display). In some embodiments, display 212 may be HDTV-capable. Speakers 214 may be provided as integrated with other elements of user equipment device 200 or may be stand-alone units. The audio component of videos and other media content displayed on display 212 may be played through speakers 214. In some embodiments, the audio may be distributed to a receiver (not shown), which processes and outputs the audio via speakers 214.

It should be understood that user equipment 200 may be a representation of, or implemented within, user equipment 108 of FIG. 1, and may, in some approaches, run widget 105. Furthermore, as mentioned above in connection with FIG. 1, user equipment 200 may include a set-top box communicatively coupled to a television. In this embodiment, widget 105 may be implemented on the set-top box, the television, or both.

Figure 3:
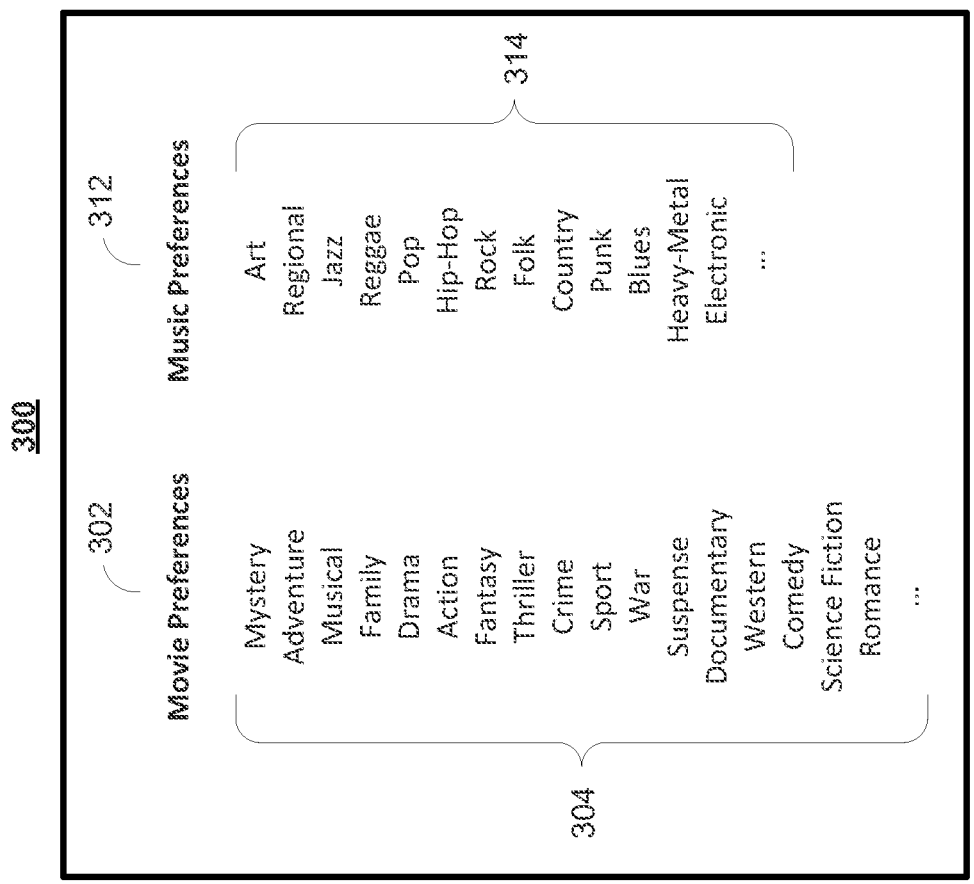
FIG. 3 illustrates an exemplary list of media content preferences associated with a user in accordance with some embodiments of the present invention.

FIG. 3 illustrates an exemplary list 300 of media content preferences associated with a user in accordance with an embodiment of the present invention. List 300 may be stored as a data structure and/or as part of a user preference profile stored in a database (e.g., database 112 of FIG. 1). List 300 may include any number of attributes for categories of media of interest to the user. For example, as depicted, list 300 may include movie preferences 302 and music preferences 312. List 100 may include, for each of the categories 302 and 312, particular media content attributes 304 and 314 defining what type or genre the user prefers. For example, the user may prefer action movies and jazz music. While list 300, as depicted, includes only movie and music preferences, it should be understood that list 300 can include any number of media content attributes for any number of media categories. For example, list 300 may also include gaming preferences. In addition, the particular attributes listed under the depicted categories are exemplary only and are not intended to be limiting. Media content attributes may include actor, artist, title, length, theme, mood, or any other suitable descriptive text.

In an embodiment, each of the media content attributes 304 and 314 may be associated with a priority and/or weighting. The priority may indicate an order of preference among attributes of the same category, while a weighting may indicate a level of user interest in a particular attribute. Two or more attributes may be assigned the same weighting indicating an equal interest in those attributes. In an embodiment, list 300 may include all available attributes for each category 302 and 312 and a weighting may be zero to indicate the user has no preference for that attribute. In another embodiment, that weighting may also indicate a level of undesirability. For instance, weightings may be negative numbers, such that large negative numbers indicate increasingly undesirable attributes.

A user preference profile containing media content attributes 304 and 314 may be produced, for example, based on direct user input and/or monitoring of user interaction with a media system or web site. Similarly, direct user input and/or monitoring may be used to assign priorities and/or weightings to attributes. In one approach, the weighting may be a numerical value from one to ten. Of course, any span of numerical values may be used.

FIG. 4 illustrates an exemplary tag cloud 400 in accordance with an embodiment of the present invention. Tag cloud 400 presents media content attributes 304 and 314 of FIG. 3 in font characteristics indicating category and weighting. Specifically, media content attributes associated with movie preferences are presented in bold italics, while attributes associates with music preferences are presented without bolding or italics. Furthermore, the weighting of each attribute is reflected by the font size of that attribute, such that a larger font size indicates a higher level of desirability to the user.

While tag cloud 200 is presented in a roughly rectangular shape, tag clouds may be arranged in other shapes, including outlines of recognizable images such as human figures, busts, animals, trees, plants, or inanimate objects. In an embodiment, a user may be provided with tools to create or select a shape of a tag cloud. Such shapes are defined by stencils. Stencils are outlines of figures or images that are used to create tag clouds by defining the dimensions and shape of an area to be populated by text (i.e., media content attributes).

Figure 5:
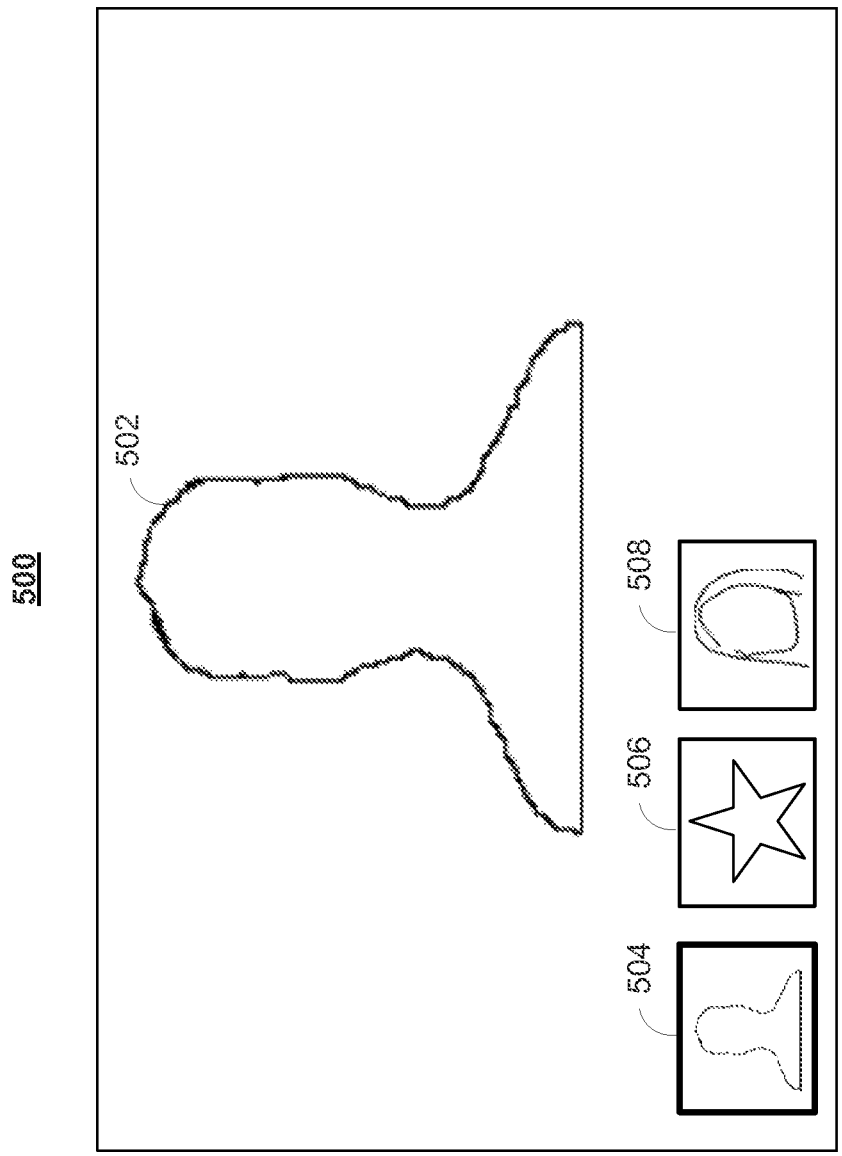
FIG. 5 illustrates an example of a stencil selection screen in accordance with some embodiments of the present invention.

FIG. 5 illustrates an example of a stencil selection screen 500 in accordance with an embodiment of the present invention. Stencil selection screen 500 may allow a user to select a particular stencil for use in generating a user preference tag cloud. Stencil selection screen 500 may be displayed to the user on a display screen of user equipment (e.g., on display 212 of FIG. 2). In some embodiments, a search may be performed to locate available stencils and/or images that can be used as stencils. This search may, in some cases, return multiple results. In one approach, the media guidance application, widget 105 of FIG. 1 (or OPP 113), or other software may arbitrarily select one of the stencils for use, or it may employ some other suitable selection scheme or algorithm. However, the multiple stencils may also be displayed to the user for selection, e.g., as display elements 504, 506, and 508. In other embodiments, no search for stencils may be performed. Instead, a user may be prompted to select a stencil of his choosing. For example, a user may navigate a directory structure to select a location that contains stencils or images of interest, or a set of stencils or images may be automatically located on user equipment and/or network-accessible storage devices. The stencils or images may then be displayed to the user for selection, e.g., as display elements 504, 506, and 508.

Selection screen 500, as shown, depicts display element 504 with a thick border, which indicates that the stencil represented by that display element is currently selected. In addition, stencil 502, corresponding to display element 504 may be displayed (as shown). A user may select a different display element, e.g., elements 406 or 408 and, as a result, stencil 502 may update to display the stencil corresponding to in the newly selected display element. Display elements 504-508 may be icons or other representations of their corresponding stencils. The display elements may be selectable, e.g., using user interface device 210 of FIG. 2.

Stencil 502 may be in the shape of a human bust or any other suitable shape. Stencil 502 may be a set of coordinates defining an area to be populated with the text of a tag cloud. Alternatively, stencil 502 may be an image or other data file defining an outline or border, e.g., from which the set of coordinates can be determined. In one embodiment, stencil 502 is one of a set of stencils provided to the user for selection. A user may browse through the set of stencils to select a preferred shape, e.g., using display screen 500. In another embodiment, stencil 502 is created by the user using, for instance, a drawing tool provided by a software program. In yet another embodiment, a user may provide and/or select an image and stencil 502 is extracted automatically from the image. For example, stencil 502 may be extracted using image processing techniques for determining the border of an object, or it may be extracted using pattern recognition techniques such as facial recognition. In one exemplary embodiment, a user selects a photograph of a person, the outline of the person's features are automatically identified, and stencil 502 is generated from the identified outline.

Once stencil 502 is selected or created, it may be used to define the outer borders of a tag cloud. The process of distributing text within the borders defined by the stencil, such that the final arrangement of text appears in the same shape as the stencil, is referred to herein as "populating" the stencil. This process is broadly illustrated in FIG. 6.

Figure 6:
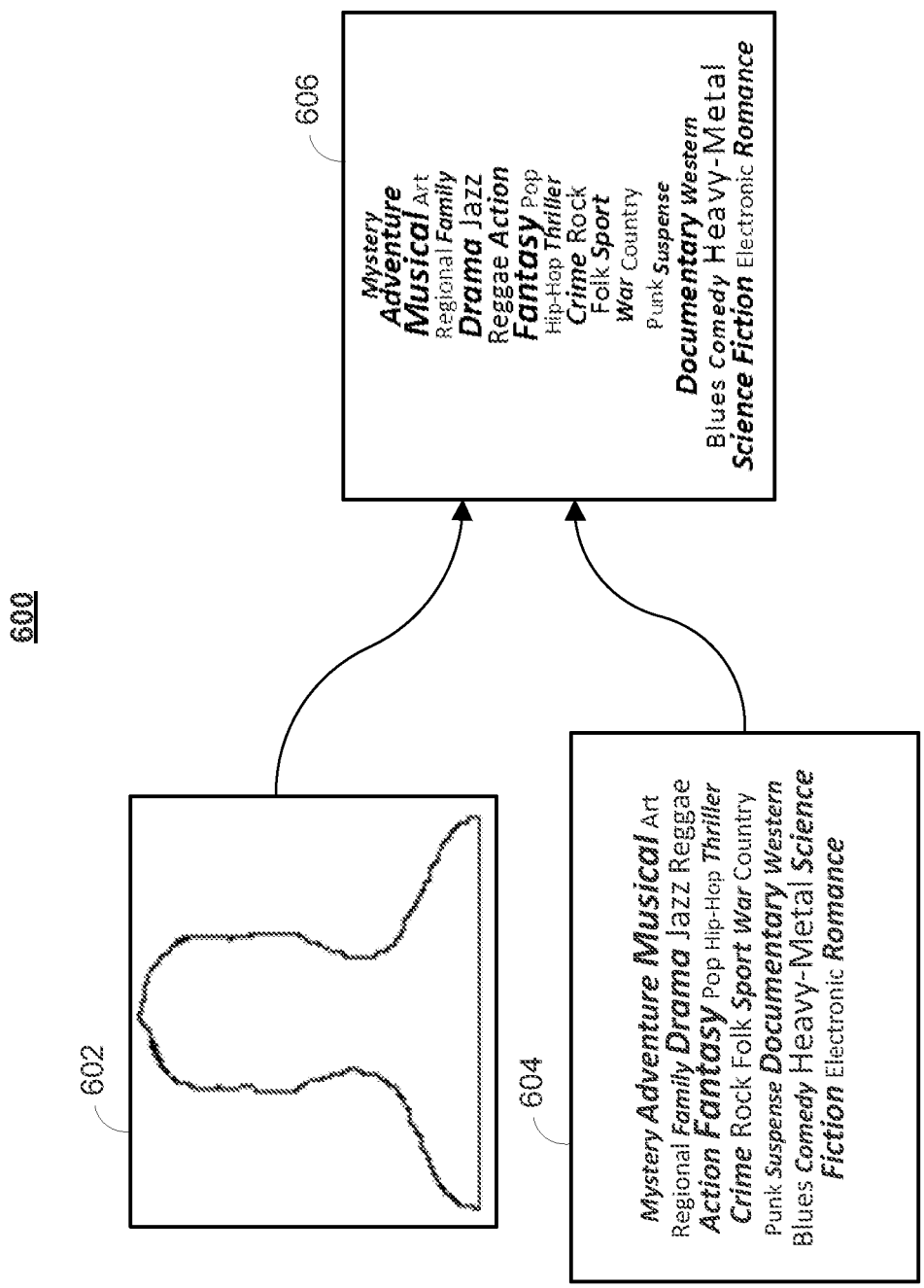
FIG. 6 illustrates an exemplary technique for generating a user preference tag cloud in accordance with some embodiments of the present invention.

FIG. 6 depicts an exemplary illustration 600 of the production of user preference tag cloud 606 in accordance with an embodiment of the present invention. In particular, stencil 602 (e.g., the stencil selected by the user) may be populated with the media content attributes of list 300 of FIG. 3 to produce tag cloud 606 in the shape of stencil 602. The font characteristics of the attributes of list 300 (FIG. 3) may be modified before, during, or after the text is arranged within stencil 602. For instance, the font characteristics of the attributes may first be modified to create tag cloud 604 and the result may be combined with stencil 602 to produce tag cloud 606 in the desired shape.

In the manner illustrated, a user's preferences are displayed in a user preference tag cloud in a shape defined by a user selected (or created) stencil. Thus, if the stencil is in the shape of the user's bust (e.g., extracted from an image of the user), the user's preferred attributes (i.e., the media content attributes) are presented in a user preference tag cloud the shape of the user's bust. By the same token, if the stencil is in the shape of a car (e.g., selected from a set of stencils provided to the user), the user's preferred attributes are presented in a tag cloud the shape of a car.

In one embodiment, stencil 602 is selected automatically without user intervention. For example, a user's profile picture (e.g., as retrieved from a social networking web service) may be retrieved automatically and used to generate stencil 602. The stencil may then be populated with the user's media content attributes such that the entire process appears seamless to the user. Then, in an embodiment, the user may be provided with tools to change or modify the stencil.

In another embodiment, stencil 602 is selected automatically from a set of default stencils. In one approach, each default stencil may be associated with a media content category. The categories associated with the default stencils may then be compared to the categories associated with the user's media content attributes to determine a match. When more than one category matches, the category with the greatest number of associated media content attributes may be used, and the default stencil associated with that category may be selected (i.e., as stencil 602). As an example, if the category is "games," the selected stencil may be in the shape of a joystick, while if the category is "sports," the selected stencil may be in the shape of a ball. In another approach, each default stencil may be associated with a media content attribute. The attributes associated with the default stencils may then be compared to the user's media content attributes to determine a match. When more than one attribute matches, the attribute with the greatest weighting may be selected, and the default stencil associated with that attribute may be selected (i.e., as stencil 602). It should be understood that default stencils may be associated with any suitable criterion and chosen on that basis, e.g., using information from the user profile.

Figure 7:
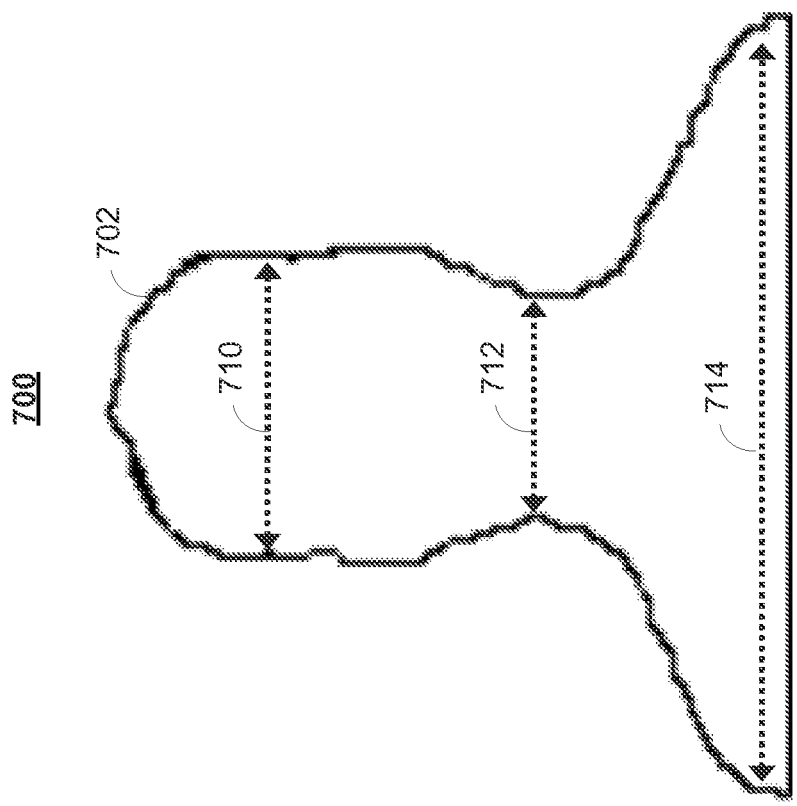
FIG. 7 illustrates an exemplary stencil being used to generate a user preference tag cloud in accordance with some embodiments of the present invention.

FIG. 7 depicts an exemplary illustration 700 of stencil 702 being used to generate a user preference tag cloud in accordance with an embodiment of the present invention. In particular, the width of stencil 702 may be determined at certain defined intervals along the vertical axis of stencil 702. Measurements 710, 712, and 714 are illustrative of how the width may vary along the vertical axis. Although only three measurements are shown, it should be understood that any suitable number of width determinations may be made. For instance, width determinations may be made at intervals equivalent to a standard text size (e.g., a 12-point font), or at a minimum text size.

The process of populating stencil 702 with the media content attributes of list 300 (FIG. 3) may involve arranging, ordering, spacing, and/or resizing each attribute as necessary to fit the text to the size and shape of the stencil, and is discussed in more detail below. Generally, however, the area within the stencil is used to determine the size of the attributes presented in the tag cloud. In one embodiment, the process of populating stencil 702 is performed under the following restraint: the sum of all of the areas of rectangles fitting tightly around each of the media content attributes as rendered in the font style and size to be used in the tag cloud must be approximately equal to but slightly less than the area contained by the stencil to be populated. The difference between the two areas may be used as spacing around and between the individual attributes presented in the tag cloud.

The set of media content attributes populating a given interval along the vertical axis of stencil 702 is referred to herein as a "horizontal run" of attributes. In other words, when the attributes are laid out horizontally, a horizontal run of attributes is the set of attributes stretching from the left border of stencil 702 to the right border of stencil 702 in a single line. A horizontal run may consist of one or more media content attributes from list 300 of FIG. 3. In some embodiments, an attribute may wrap from one horizontal run to another. Although the description herein describes embodiments of the invention in terms of horizontal runs, it should be understood that the same techniques may be applied when the attributes are laid out vertically, or when the attributes are laid out both vertically and horizontally.

In an embodiment, the font characteristics of each attribute in a horizontal run are selected so that the width of each horizontal run, including spacing between attributes, is approximately equal to but less than the width of the stencil at the location of the horizontal run. In another embodiment, the longest attribute or set of attributes is selected that fits within the width of the stencil starting with the narrowest location and proceeding to the widest location. Thus, the narrowest locations in the stencil are populated with the longest possible attributes that fit the width of the stencil at that location.

In an embodiment, when the media content attributes as rendered in the font style and size to be used in the tag cloud cannot be laid out in such a way as to fit within the area of the stencil, the stencil is enlarged to accommodate the attributes, or the attributes are scaled down to fit the stencil. Other techniques for arranging the media content attributes within the stencil area include varying the order of the attributes, aligning the attributes (e.g., centering or justifying the attributes), expanding or decreasing the amount of space between letters of the attributes, and modifying the spacing between the attributes themselves. In addition, some attributes may be left out of the tag cloud based on their associated priority or weighting.

In an embodiment, each media content attribute in list 300 (FIG. 3) may be sized in accordance with its associated weighting relative to a standard font size. Then, all the attributes may be scaled together so that the sum of their respective areas, including spacing, is approximately equal to but slightly less than the area contained by the stencil to be populated. Then the order of the attributes may be manipulated so that each horizontal run fills the width of the stencil at that location. An iterative approach may be employed to arrive at a suitable solution, where the attributes are repeatedly scaled and ordered.

Referring back to FIG. 6, an exemplary tag cloud 606 of the media content attributes of list 300 (FIG. 3) arranged within the borders of stencil 602 is depicted in accordance with an embodiment of the present invention. Tag cloud 606 is arranged in the approximate shape of stencil 602 and may be displayed together with a border defined by the stencil (not shown).

Tag cloud 606, with or without a border, may be displayed to the user, e.g., in a media guidance application or posted to a social networking service. Tag cloud 606 may also be saved as an image or text file and stored in a storage device, or uploaded to an external server. Tag cloud 606 may be shared with other users or saved for later use.

Figure 8:
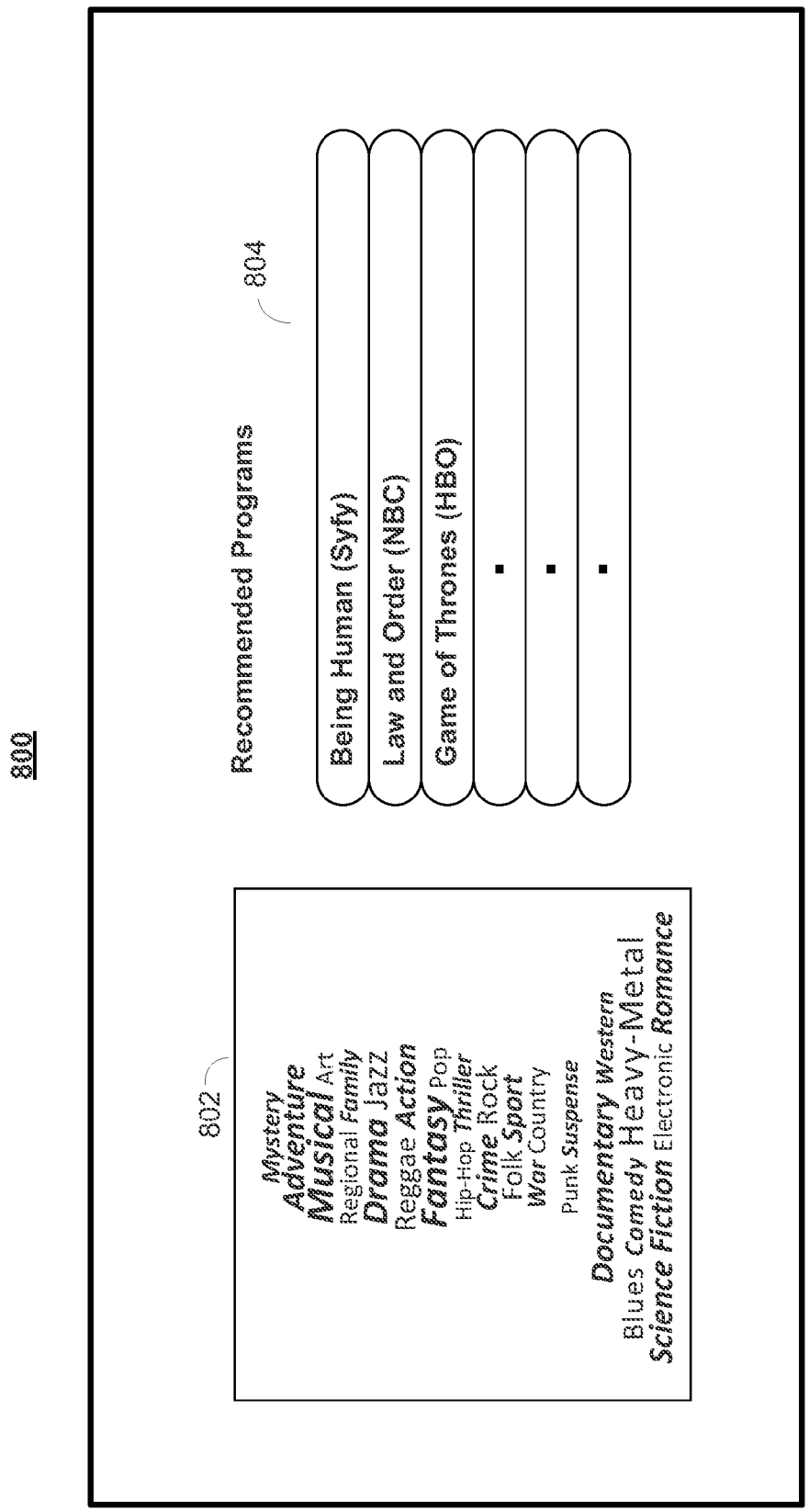
FIG. 8 illustrates an exemplary display screen that presents a user preference tag cloud together with media content recommendations in accordance with some embodiments of the present invention.

FIG. 8 shows exemplary display screen 800 that presents user preference tag cloud 802 together with media content recommendations 804 in accordance with an embodiment of the present invention. Media content recommendations may be chosen based on the media content attributes displayed within user preference tag cloud 802, which may be the same as those stored within the user profile. Specifically, a recommendation engine (e.g., widget 105 of FIG. 1, or a media guidance application) may search through available media content (e.g., media listings) to locate content with attributes matching the media content attributes displayed in user preference tag cloud 802. Thus, the user can immediately identify, from tag cloud 802, the set of media content attributes that resulted in media content recommendations 804.

In some embodiments, media content recommendations 804 are selected based on weightings associated with the media content attributes of user preference tag cloud 802 and, in some cases, ordered accordingly. Thus, the media content shown at the top of media content recommendations 804 may reflect media content with attributes matching those that appear in the largest font in tag cloud 802 (i.e., the media content attributes with the largest weightings). Again, such a feature ties the appearance of the tag cloud to the media content selections listed as media content recommendations 804, thereby providing the user with insight into how the recommendations are being made, i.e., which media content attributes are being taken into account and how much weight each attribute is being given by the recommendation engine.

In some embodiments, a user may manipulate user preference tag cloud 802 to modify the media content attributes used to identify media content recommendations 804. The modifications to tag cloud 802 may also be stored in the user profile. A user may interact with user preference tag cloud 802, for example, to add, remove, or change the weighting of an attribute. The user may, in some embodiments, interact with tag cloud 802 directly by, e.g., clicking and dragging the media content attributes. For instance, the user can modify the size of an attribute in the tag cloud, the location of an attribute within the tag cloud, or some other characteristic (e.g., style) of an attribute. The tag cloud may automatically readjust to accommodate these modifications. In some embodiments, the readjustment is real-time and dynamically displayed to the user.

In some embodiments, the user can drag media content attributes out of user preference tag cloud 802 to remove them from the tag cloud and/or the user profile. The removed attribute may remain on-screen for a period of time so that the user can reinsert the attribute into user preference tag cloud 802. Alternatively, the removed attribute may also be removed from the display. In that case, the attribute may be reinserted using another technique, such as that described with reference to FIG. 9.

Figure 9:
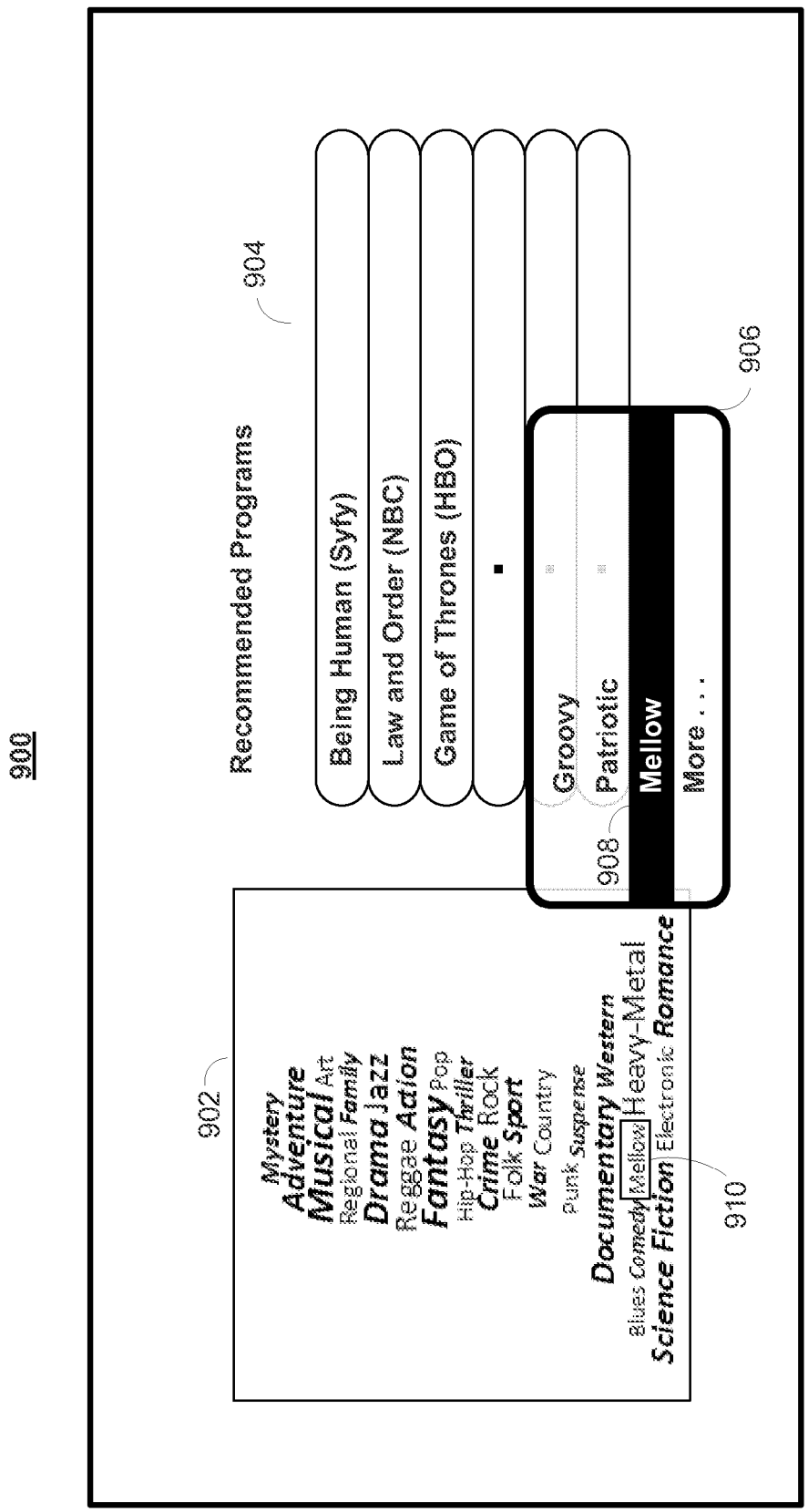
FIG. 9 illustrates an exemplary display screen that presents an overlay for adding attributes to a user preference tag cloud in accordance with some embodiments of the present invention.

FIG. 9 shows exemplary display screen 900 that presents overlay 906 for adding media content attributes to user preference tag cloud 902 in accordance with an embodiment of the present invention. Overlay 906 may be a dialog box or any other suitable display area, and may be invoked by the user to add attributes to tag cloud 902. As depicted, user preference tag cloud 902 may update in real-time to display the tag cloud with the media content attribute currently selected in overlay 906. Specifically, attribute 908 appears selected and tag cloud 902 accordingly displays attribute 910 in tag cloud 902. In some embodiments, attribute 910 appears highlighted, with a border (as shown), or with some other visual indication or font characteristic to indicate that the attribute is being added. After the attribute is in fact added to the tag cloud, a visual indication or font characteristic may also be used to indicate that the attribute was recently added.

Tag cloud 902 is an exemplary tag cloud that results when the user adds the attribute "Mellow" to tag cloud 802 of FIG. 8. As shown, the attributes in the horizontal run to which the new attribute is added may be resized to accommodate the new attribute without changing the width of the run. The weighting of the resized attributes may also, in some embodiments, be reduced by an amount proportional to the reduction in size and stored in the user profile. In this way, the user can drag and drop the new attribute into a horizontal run containing attributes he wishes to deemphasize.

Alternatively, the sizing, order, and/or placement of all the attributes of the tag cloud may be modified to accommodate the new attribute. Generally, user preference tag cloud 902 may automatically readjust to accommodate the addition or removal of attributes. In some embodiments, the readjustment is real-time and dynamically displayed to the user. The readjustment can include automatically scaling the font size of the attributes and/or rearranging the location of the attributes. Alternatively, or in addition, the readjustment can include automatic scaling of the tag cloud itself to reduce or increase the area available for attributes.

In some embodiments, tag cloud 902 is modified by repeating the process used to generate the tag cloud in the first place, i.e., the original stencil is populated with the modified list of media content attributes using the same techniques employed to populate the stencil with the original list of attributes, as described in greater detail below. Similarly, this process may be used when a font characteristic (e.g., font size) of a media content attribute is changed by the user, or when the user changes the location of an attribute within the tag cloud.

In an embodiment, the user can interact with user preference tag cloud 902 to resize an attribute within the tag cloud. When a user hovers over, scrolls over, or otherwise selects an attribute, a visual indication may be displayed indicating that the attribute may be modified. For example, a border may appear around the attribute. The user may then resize the attribute, for instance, by stretching the border. In an embodiment, the weighting attached to that attribute is adjusted according to the amount of scaling and stored in the user profile. In this manner, the user can adjust the level of interest associated with each attribute graphically, and can do so relative to the other attributes displayed. Thus, the user is provided with immediate visual feedback indicating the weightings associated with each attribute in the user profile.

Accordingly, user preference tag cloud 902 may provide the user with a user-friendly and compelling interface for specifying media content preferences that can be stored in a user profile and used for providing media content recommendations. Specifically, the ability to manipulate media content attributes and their associated weightings (e.g., in real-time) through interaction with the tag cloud ensures the user profile accurately reflects the user's tastes. In one embodiment, media content recommendations 904 may update automatically, in real-time, as the attributes of user preference tag cloud 902 are manipulated by the user.

Figure 10:
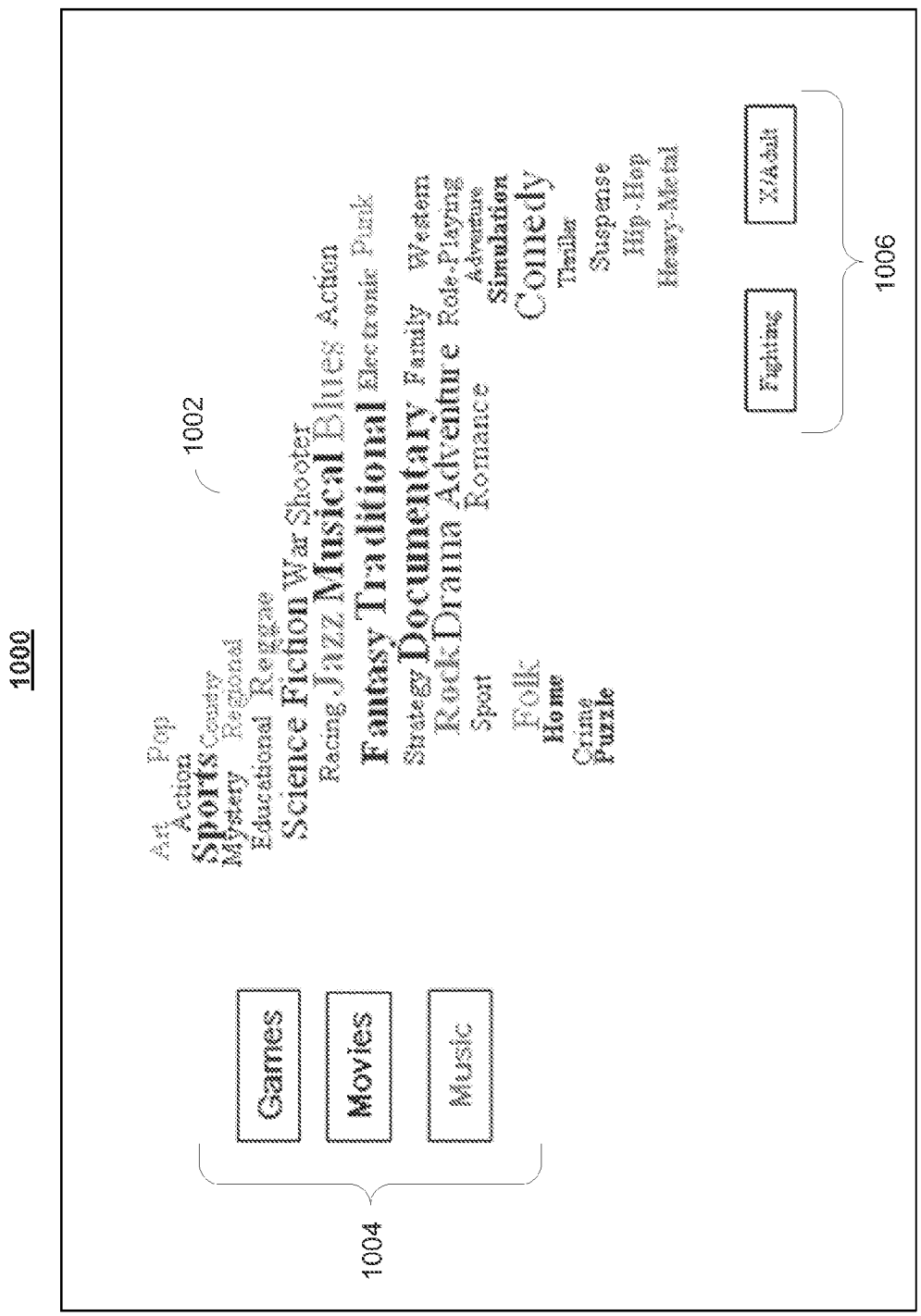
FIG. 10 illustrates an exemplary display screen that presents a user preference tag cloud together with a category key and/or one or more attribute elements in accordance with some embodiments of the present invention.

FIG. 10 shows exemplary display screen 1000 that presents user preference tag cloud 1002 together with category key 1004 and attribute elements 1006 in accordance with an embodiment of the present invention. As shown, attribute elements 1006 may be displayed outside user preference tag cloud 1002. This placement may indicate that the user has not indicated a preference for these attributes and/or that the user monitoring data contains no information related to these attributes. Although depicted in FIG. 10, it should be understood that attribute elements 1006 may not appear at all on display screen 1000.

Category key 1004 may display the media content categories of the attributes in tag cloud 1002. In FIG. 10, category key 1004 indicates that user preference tag cloud 1002 includes attributes that the user prefers for games, movies, and music. In some embodiments, one or more font characteristics of each category in category key 1004 may match those of the corresponding attributes in tag cloud 1002. For example, as depicted, the movies, games, and music categories are displayed in progressively lighter levels of bold, as are their corresponding attributes in user preference tag cloud 1002. In some embodiments, scrolling over or selecting a category in category key 1004 highlights the corresponding attributes in tag cloud 1002.

The user may drag and drop attribute elements 1006 into tag cloud 1006, as described above, to add the elements to the tag cloud. Thus, display screen 1000 presents an alternative interface to that of FIG. 9 for adding attributes to a tag cloud. In some embodiments, the user may retrieve information about the attributes belonging to each category by selecting the category from category key 1004. Alternatively, the user may select an attribute in tag cloud 1002 to retrieve information about the category to which it belongs.

FIG. 11 shows exemplary display screen 1100 that presents category detail table 1102 in accordance with an embodiment of the present invention. Detail table 1102 may include information pertaining to each attribute belonging to the selected category. For example, as depicted, detail table 1102 presents each attribute available for the "Games" category and categorizes each game played by the user according to its associated attribute. Thus, the user can see what kinds of games they played in each major genre. In some embodiments, the more times the game was played, the higher the weighting of the corresponding genre attribute and the larger the attribute is displayed in the tag cloud. Detail table 1102 may display weightings associated with attributes and, in some cases, the user may directly modify those weights. In some embodiments, detail table 1102 may indicate that the user manipulated the weight associated with an attribute.

Detail table 1102 may also include attributes under which no games are categorized. For example, the user may not have played any games belonging to a particular genre. As depicted, detail table 1102 has no information listed for the "Fighting" or "X/Adult" game genres, hence the location of attribute elements 1006 in FIG. 10 (i.e., outside tag cloud 1002).

The following flow charts serve to illustrate processes involved in some embodiments of the invention. Where appropriate, these processes may, for example, be implemented completely in the processing circuitry of a user equipment device (e.g., control circuitry 204 of FIG. 2) or may be implemented at least partially in a remote server (e.g., servers 122 of FIG. 1). Moreover, these processes may be initiated, performed, and/or controlled by widget 105 or OPP 113 of FIG. 1 or a combination thereof. It should be understood that the steps of the flow charts are merely illustrative and any of the depicted steps may be modified, omitted, or rearranged, two or more of the steps may be combined, or any additional steps may be added, without departing from the scope of the invention.

Figure 12:
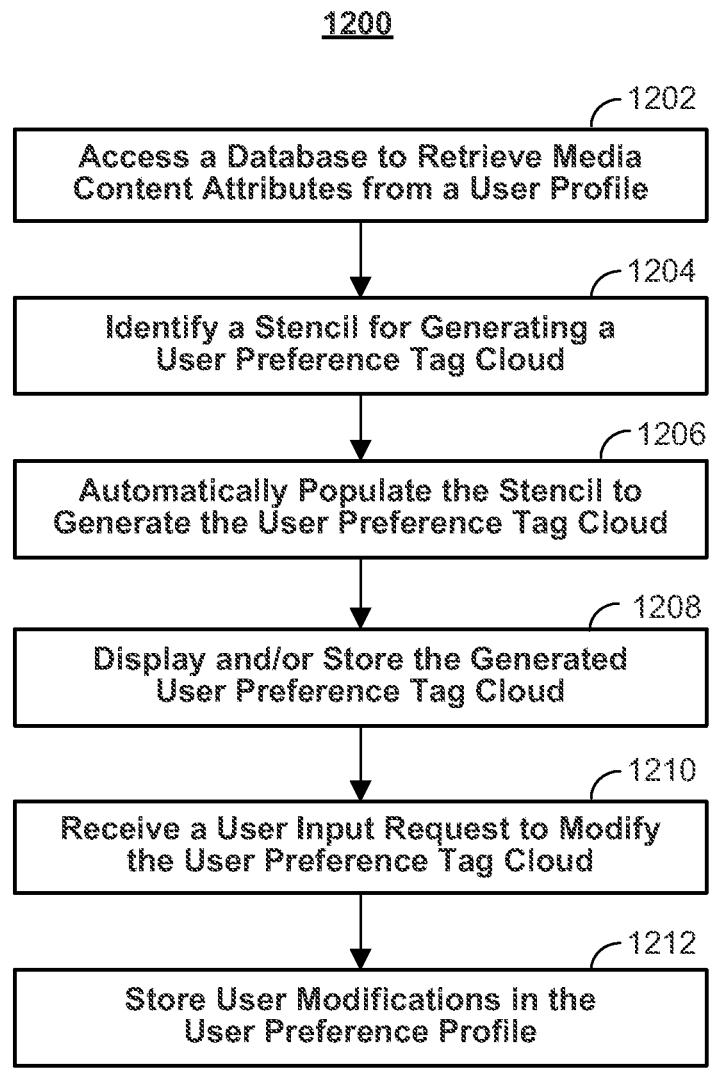
FIG. 12 illustrates a flow chart of an exemplary process for generating and/or displaying a user preference tag cloud in accordance with some embodiments of the present invention.

Turning to FIG. 12, illustrative flow chart 1200 is shown depicting an exemplary process for generating and/or displaying a user preference tag cloud in accordance with some embodiments of the present invention. At step 1202, media content attributes are received from a user preference profile. For instance, a database may be accessed to retrieve media content attributes from a user preference profile. The attributes may be associated with different media content categories and define a user's tastes in those categories, as discussed above. The user preference profile may be stored at user equipment (e.g., user equipment 108 of FIG. 1), in an external database (e.g., databases 112 of FIG. 1), or at any other suitable location. At step 1204 a stencil is identified for use in generating a user preference tag cloud. Any suitable technique for locating, selecting, extracting, or otherwise generating a stencil may be employed. For example, FIGS. 13A and 13B, described below in greater detail, illustrate processes that may be employed to identify a stencil for the tag cloud generation process.

Figure 14:
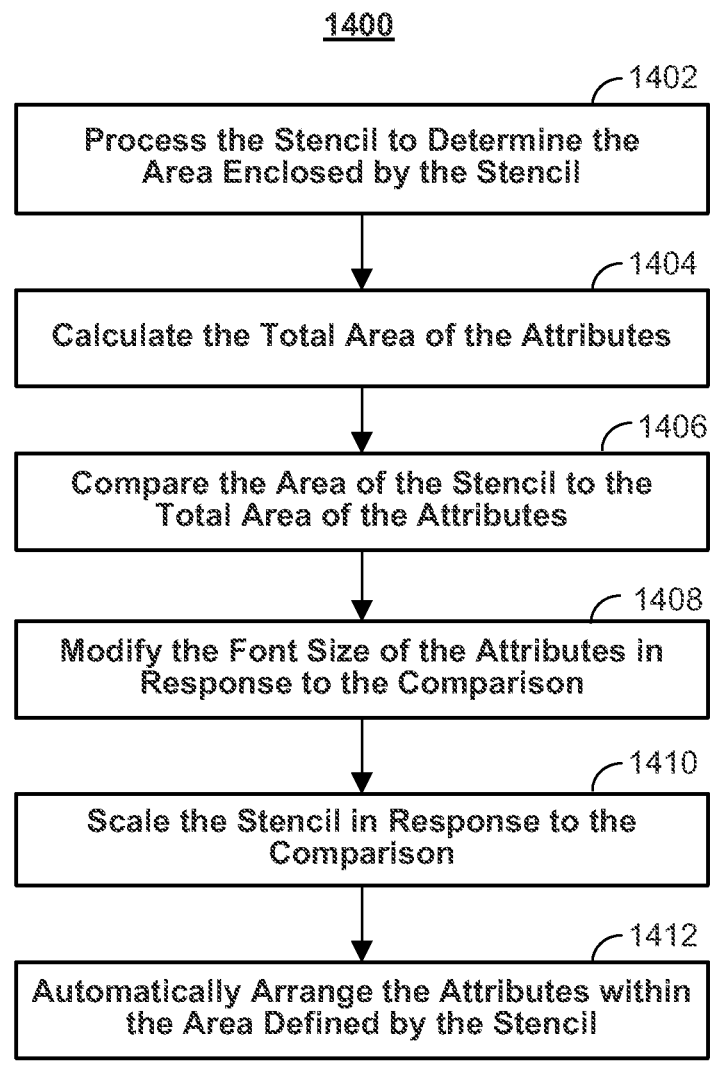
FIG. 14 illustrates a flow chart of an exemplary process for populating a stencil to generate a user preference tag cloud in accordance with some embodiments of the present invention.
Figure 15A:
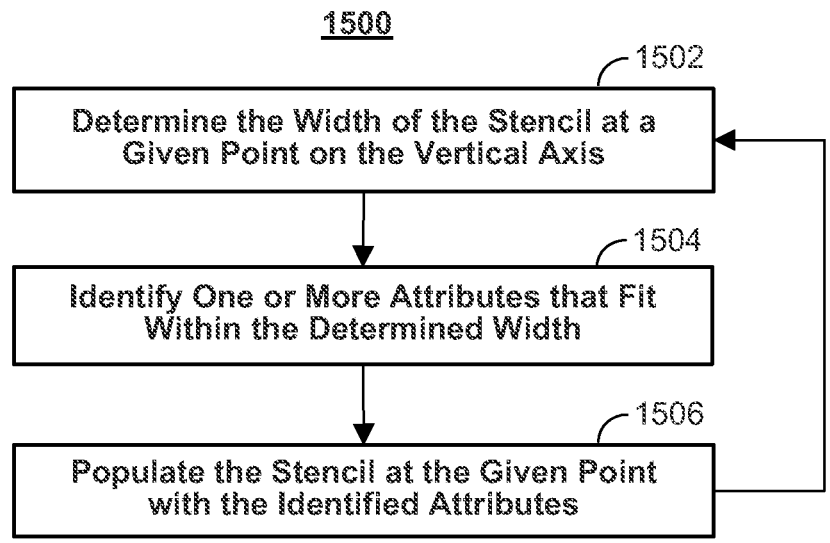
FIG. 15A illustrates a flow chart of an exemplary process for arranging attributes within a stencil in accordance with some embodiments of the present invention.
Figure 15B:
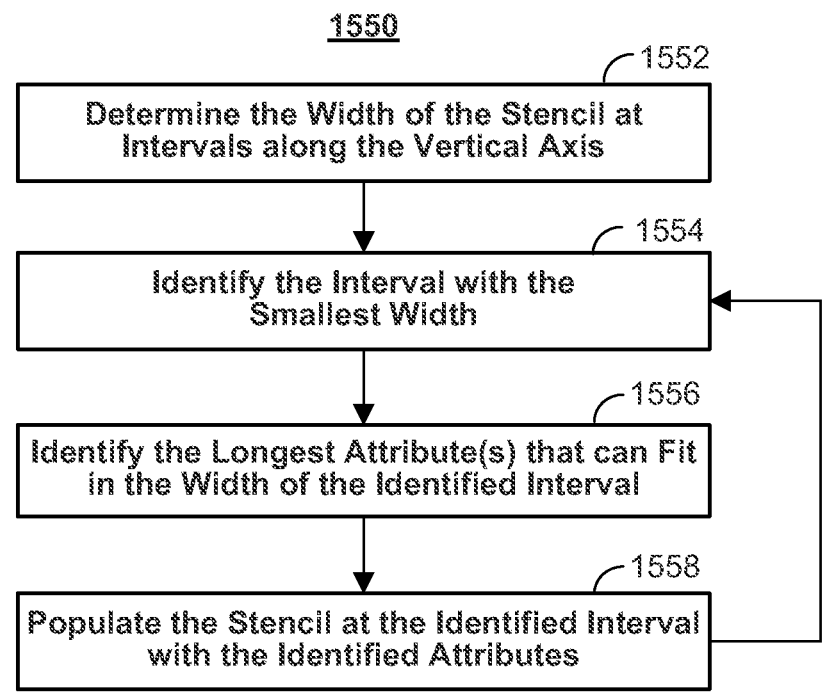
FIG. 15B illustrates a flow chart of another exemplary process for arranging attributes within a stencil in accordance with some embodiments of the present invention.

At step 1206, the stencil is automatically populated with the media content attributes retrieved from a user preference profile in step 1202. As discussed above, the stencil is used to define the outer borders of a tag cloud. Populating the stencil may therefore include setting the font characteristics of the attributes and distributing the attributes within the borders defined by the stencil, such that the final arrangement of text appears in the same shape as the stencil. Examples of this process are depicted in the flowcharts of FIGS. 14, 15A and 15B, which are described below in greater detail. The generated user preference tag cloud is the final arrangement of attributes within the stencil that results from the stencil populating process.

At step 1208, the user preference tag cloud is stored and/or displayed. In particular, the generated user preference tag cloud may be stored at user equipment 108, databases 112, or servers 122 of FIG. 1. In an embodiment, the user preference tag cloud may be posted to a user's Facebook page or other web site. Alternatively, or in addition, the generated user preference tag cloud may be displayed on a display screen. For example, the tag cloud may be displayed to the user within a media guidance application or web site, as depicted in FIG. 8.

It should be understood that a user preference tag cloud need not be generated each time it is displayed. Once a user preference tag cloud has been generated and stored, the process of displaying the tag cloud, and allowing a user to interact with that tag cloud, may begin with step 1208. Thus, in an embodiment, more than one user preference tag cloud may be stored for a single user and a user may select whichever tag cloud he desires at the moment. For example, the user may maintain separate tag clouds for the user's different moods. Similarly, tag clouds may be shared amongst multiple users.

At step 1210, the user may interact with the displayed user preference tag cloud. Specifically, the system may receive a user input request to modify the user preference tag cloud (e.g., via user input interface 210 of FIG. 2). As described above, in one embodiment, the user may interact with the tag cloud directly to rearrange, resize, add, remove, or otherwise modify attributes. For example, the user can drag and drop attributes into, out of, and around the tag cloud, thereby adding, removing, and rearranging attributes, respectively. As another example, the user can resize an attribute by dragging its corner or a border surrounding the attribute (which may appear when the attribute has the focus). As yet another example, a user may modify font characteristics of an attribute in the tag cloud by selecting that attribute (e.g., double-clicking the attribute) and setting font characteristics (e.g., in a dialog box). It should be understood that these examples only illustrate a few techniques for interacting with and modifying the tag cloud and its attributes, and are not intended to be limiting. It is contemplated that other known techniques for manipulating text and objects may be adapted for the purpose of adjusting a tag cloud.

At step 1212, the user modifications to the tag cloud and attributes are stored back in the user preference profile. For example, weightings assigned to attributes that are stored in the profile may be updated to reflect any resizing of the attributes. The modified tag cloud itself may also be stored, e.g., at user equipment or an external server or database. In this manner, the user profile is kept in synch with the user preference tag cloud, and enables the tag cloud to act as a user interface for modifying the underlying profile.

Figure 13A:
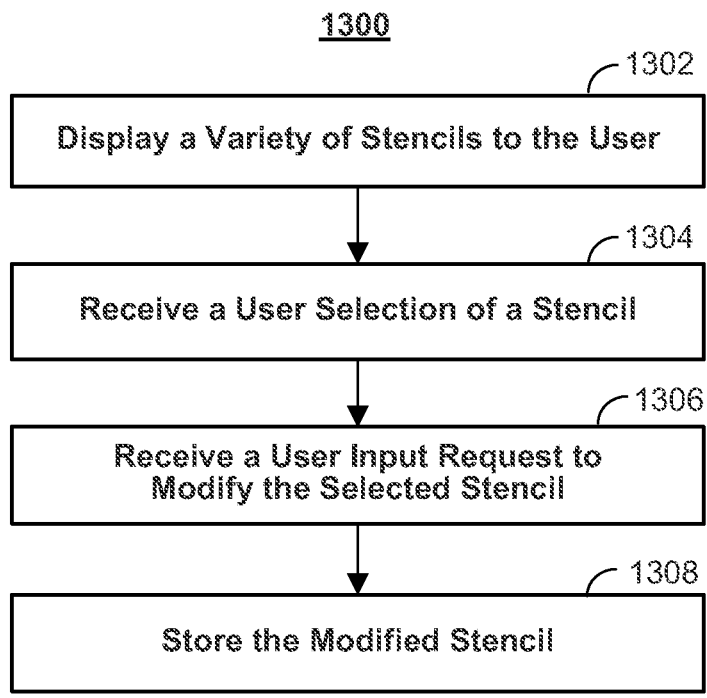
FIG. 13A illustrates a flow chart of an exemplary process for identifying a stencil in accordance with some embodiments of the present invention.

Turning to FIG. 13A, illustrative flow chart 1300 is shown depicting an exemplary process for identifying a stencil in accordance with some embodiments of the present invention. The process represented by flow chart 1300 may be incorporated in whole or in part into step 1204 of FIG. 12. At step 1302, a variety of stencils may be displayed to the user. For example, stencils may be displayed for user selection as depicted in FIG. 5, described above.

Stencils may be provided by OPP 113 or stencil server 116 through communications network 130 of FIG. 1, or user equipment 108 may have been pre-loaded with stencils. Alternatively, the user may download stencils from a web site or from another user (e.g., sent via email). Stencils may be stored as a particular stencil data file, as an image file, or as any other suitable data file or record (e.g., in a database). In one embodiment, the system may search the user's hard drive and/or any networked storage devices for stencils.

At step 1304, a user selection of a stencil may be received. For example, a user may select one of the set of stencils displayed on the display screen of FIG. 5. As another example, the user may direct the system to a stencil file on a hard drive. At step 1306, the user may modify the selected stencil. Specifically, the system may receive a user input request to modify the selected stencil (e.g., via user input interface 210 of FIG. 2). For instance, the user may use an image editing software program to manipulate the borders defining the stencil. As another example, the user may directly modify sets of coordinates defining the border of the stencil. At step 1308, the modified stencil is stored for future use.

Figure 13B:
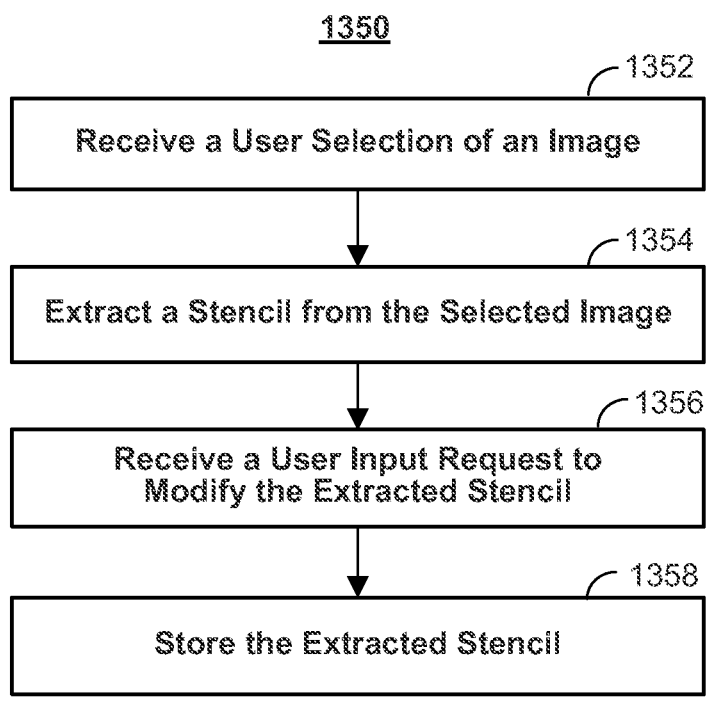
FIG. 13B illustrates a flow chart of an exemplary process for identifying a stencil using an existing image in accordance with some embodiments of the present invention.

FIG. 13B shows illustrative flow chart 1350 depicting an exemplary process for identifying a stencil using an existing image in accordance with some embodiments of the present invention. The process represented by flow chart 1350 may be incorporated in whole or in part into step 1204 of FIG. 12. At step 1352, the user may select or otherwise identify an image (e.g., an image file on the user's hard drive or a web site). At step 1354, a stencil is extracted from the selected image. Stencil extraction may be performed using any suitable technology, including border and pattern recognition. For example, a photograph of a car may be processed to recognize the outlines of the car, and that outline may be used to define the stencil. As another example, pattern recognition technology may be used to detect the profile of a human in a picture, and that profile may serve as the basis for generating a stencil.

In an embodiment, steps 1352 and 1354 may be automatically performed. For example, the system may automatically access the user's Facebook page, retrieve the user's profile picture, and extract a stencil from the retrieved picture.

At step 1356, the user may modify the extracted stencil. Specifically, the system may receive a user input request to modify the extracted stencil (e.g., via user input interface 210 of FIG. 2). For instance, the user may use an image editing software program to manipulate the borders defining the stencil. As another example, the user may directly modify sets of coordinates defining the border of the stencil. At step 1358, the modified stencil is stored for future use.

Turning to FIG. 14, illustrative flow chart 1400 is shown depicting an exemplary process for populating a stencil to generate a user preference tag cloud in accordance with some embodiments of the present invention. The process represented by flow chart 1400 may be incorporated in whole or in part into step 1206 of FIG. 12. At step 1402, the area enclosed by the stencil to be used in generating the tag cloud is determined, e.g., by processing the stencil. This area may be calculated, for example, by dividing the stencil into intervals along its vertical axis and summing the areas of each of the intervals, the latter of which may be calculated by multiplying the width of the stencil at the location of the interval by the height of the interval. The number of intervals can be chosen to optimize processing speed or accuracy, and may be any suitable number. This technique of calculating area is only exemplary and it should be understood that any suitable technique may be used.

At step 1404, the total area of the attributes which are to constitute the user preference tag cloud is determined. The area of an attribute may be calculated using the font size of the attribute and the number of characters in the attribute text (and other font characteristics). Alternatively, the area of an attribute may be determined by drawing a rectangle tightly around the attribute and multiplying the height of the rectangle by its width. Of course, these techniques are only exemplary and any suitable method of measuring the area of text may be used instead. The areas of all the attributes are summed to calculate the total area of the attributes. In some embodiments, spacing between the individual attributes may be added into the total area calculation.

In one embodiment, the areas of the attributes are calculated after their font characteristics have been appropriately set. In particular, each attribute's font size may be scaled according to its assigned weighting relative to a standard font size. Additionally, each attribute's color, font face, and/or font style (e.g., bold, italics, character spacing, etc.) may be modified to match a color, font face, and/or font style assigned to the media content category to which it belongs. Accordingly, the area calculated for each attribute may include a measure of that attribute's display size relative to the other attributes. In another embodiment, the areas of the attributes are calculated before their font characteristics have been appropriately set, i.e., the areas are based on a standard font size and vary only with the length of the attribute text. This approach may be useful in cases where each attribute is displayed in the same font face and size, or in cases where the effects of the attribute font characteristics are independently calculated and added to the total area measurement.

In one embodiment, the area of the stencil calculated in step 1402 sets the maximum area into which the attributes must fit. The total area of the attributes calculated in step 1404, including spacing, must therefore be less than the area of the stencil calculated in step 1402. Accordingly, at step 1406, the area of the stencil calculated in step 1402 is compared with the total area of the attributes calculated in step 1404 to ensure this condition is met. If it is, then the process may skip to step 1412, where the attributes are arranged within the area defined by the stencil. The difference between the two areas may be used as spacing between the attributes. Alternatively, the process may proceed with step 1408, where the font size of the attributes may be modified so as to increase the total area of the attributes, including spacing, to just less than the area of the stencil. In this manner, the attributes will take up a maximal amount of space within the stencil and the resulting tag cloud will better convey the shape of the stencil. Once the attribute size is set in step 1408, the process may proceed with step 1412, where the attributes are arranged within the stencil area.

If, however, the total area of the attributes is not less than the area of the stencil, as determined in step 1406, the process may proceed with step 1408. At step 1408, the size of the attributes may be modified so as to decrease the total area of the attributes, such that the total area, including spacing, is just less than the area of the stencil. In this manner, the attributes will take up a maximal amount of space, but within the area defined by stencil. Once the attribute size is set in step 1408, the process may proceed with step 1412, where the attributes are arranged within the stencil area.

Modification of attribute size in step 1408 may be performed on the attributes as a whole or on an attribute-by-attribute basis. In the former approach, each attribute may be scaled the same amount as necessary to achieve a desired total area. In the latter approach, all attributes of a particular initial size may be scaled together without affecting attributes of other sizes. For instance, the largest attributes may be scaled down to a size less than their initial size, but still reflective of their relative importance. In yet another approach, the least important attribute (i.e., with the lowest weighting) is altogether removed when the total area of the attributes must be reduced; and, similarly, such an attribute may be added when the total area of the attributes must be increased. In still another approach, one or more particular attributes may be resized, as needed, based on some criteria (e.g., the attributes are similar to each other). It should be understood that one or more of these approaches may be combined to achieve the overall desired effect on the total attribute area.

In another embodiment, the total area of the attributes calculated in step 1404 sets the minimum area required by the attributes. The area of the stencil calculated in step 1402 must therefore be greater than the total area of the attributes calculated in step 1404, including spacing. Accordingly, at step 1406, the area of the stencil calculated in step 1402 is compared with the total area of the attributes calculated in step 1404 to ensure this condition is met. If it is, then the process may skip to step 1412, where the attributes are arranged within the area defined by the stencil. The difference between the two areas may be used as spacing between the attributes. Alternatively, the process may proceed with step 1410, where the size of the stencil may be modified so as to reduce the total area of the stencil to just more than the total area of the attributes, including spacing. In this manner, the attributes will take up a maximal amount of space within the stencil and the resulting tag cloud will better convey the shape of the stencil. Once the stencil size is set in step 1410, the process may proceed with step 1412, where the attributes are arranged within the stencil area.

If, however, the area of the stencil is not greater than the total area of the attributes, as determined in step 1406, the process may proceed with step 1410. At step 1410, the size of the stencil may be modified so as to increase the area of the stencil, such that it is just greater than the total area of the attributes. In this manner, the attributes will take up a maximal amount of space, but within the area defined by stencil. Once the stencil size is set in step 1410, the process may proceed with step 1412, where the attributes are arranged within the stencil area.

It should be understood that the two embodiments described above may also be used in combination. For example, both the font size of the attributes and the size of the stencil may be modified, i.e., the process may execute both steps 1408 and 1410. This may facilitate the production of a tag cloud with the closest fit to the stencil shape. It should be understood that the process may first execute step 1408 and then proceed to step 1410, or vice versa, or the process may iterate between the two steps as many times as necessary to achieve the desired result.

As described above, the attributes are automatically arranged within the area defined by the stencil (which have been modified in step 1410) at step 1412. Exemplary processes for arranging the attributes are depicted in FIGS. 15A and 15B. However, it is contemplated that other techniques and algorithms may be employed to suitably distribute the attributes within the stencil area. In some embodiments, more than one attribute arrangement technique may be employed and the best resulting tag cloud may be chosen.

Turning to FIG. 15A, illustrative flow chart 1500 is shown depicting an exemplary process for arranging attributes within a stencil in accordance with some embodiments of the present invention. The process represented by flow chart 1500 may be incorporated in whole or in part into step 1412 of FIG. 14. At step 1502, the width of the stencil is determined at a given point on the vertical axis of the stencil. In one approach, the process proceeds from the top of the stencil to the bottom, or vice versa, and the width is determined at given intervals. In another approach, the process begins with a point in the middle of the stencil and proceeds to determine widths at intervals above and below that point.

At step 1504, one or more attributes are identified that fit within the width determined in step 1502. In other words, the total length of the attributes, from end to end, does not exceed the width of the stencil at the given location. The process may iterate through all attributes not yet placed to select the best fitting attributes for the location, or the process may select the first of those attributes that satisfy certain criteria. Aside from not exceeding the width determined in step 1502, the criteria may include a minimum length of the attributes, such that the spacing from each end of the stencil is not too large.

At step 1506, the stencil is populated with attributes identified in step 1504 at the given point. As discussed above, the resulting set of attributes is called a horizontal run of attributes. In some embodiments, after the attributes are selected for placement, their font characteristics may be modified slightly to better fit the location (e.g., the character spacing or font size may be slightly adjusted).

As shown in FIG. 15A, the above described process may repeat until the stencil is completely populated; that is, until every attribute has been placed within the stencil. The result is the user preference tag cloud.

Turning to FIG. 15B, illustrative flow chart 1550 is shown depicting another exemplary process for arranging attributes within a stencil in accordance with some embodiments of the present invention. The process represented by flow chart 1550 may be incorporated in whole or in part into step 1412 of FIG. 14. At step 1552, the stencil may be divided into discrete intervals along the vertical axis of the stencil. For example, the stencil may be divided into intervals the size of a standard font height. The width of the stencil at the location of each of these intervals may then be determined.

At step 1554, the interval with the smallest width is identified. Then, at step 1556, the longest remaining attribute or set of attributes that fit within the width of the interval are selected. That is the fewest possible number of attributes are selected for the interval. The total length of the attributes, from end to end, must not exceed the width of the stencil at the location of the interval, but the length should be as close as possible to that width.

At step 1558, the stencil is populated with attributes identified in step 1556 at the location of the identified interval. As discussed above, the resulting set of attributes is called a horizontal run of attributes. In some embodiments, after the attributes are selected for placement, their font characteristics may be modified slightly to better fit the location (e.g., the character spacing or font size may be slightly adjusted).

As shown in FIG. 15B, steps 1554 to 1558 may repeat until the stencil is completely populated; that is, until every attribute has been placed within the stencil. The result is the user preference tag cloud. Specifically, the process may identify the interval with the next smallest width and populate that interval with the fewest possible number of attributes.

It will be apparent to those of ordinary skill in the art that methods, techniques, and processes involved in the present invention may be embodied in a computer program product that includes a non-transitory computer usable and/or readable medium. For example, such a non-transitory computer readable medium may consist of a read-only memory device, such as a CD-ROM disk or conventional ROM devices, or a random access memory, such as a hard drive device or a computer diskette, having a computer readable program code stored thereon.

It is to be understood that while certain forms of the present invention have been illustrated and described herein, it is not to be limited to the specific forms or arrangement of parts described and shown. Those skilled in the art will know or be able to ascertain using no more than routine experimentation, many equivalents to the embodiments and practices described herein. Accordingly, it will be understood that the invention is not to be limited to the embodiments disclosed herein, which are presented for purposes of illustration and not of limitation.

What is claimed is:

1. A method for presenting user profile information, the method comprising:
retrieving the user profile information from a database, wherein the user profile information includes media content attributes;
automatically selecting a stencil from a plurality of stencils based on the user profile information, wherein the stencil defines a shape and a size of a text area;

generating for display, on a display screen, a user preference tag cloud comprising the media content attributes, wherein the media content attributes are arranged within the text area based on the shape and the size of the text area of the automatically selected stencil.

2. The method of claim 1, wherein each of the media content attributes has an associated media content category, and wherein generating a user preference tag cloud comprises rendering each of the media content attributes in a font characteristic indicative of its associated media content category.

3. The method of claim 1, wherein each of the media content attributes has an associated weighting factor indicating an importance of the given media content attribute to a user, and wherein generating a user preference tag cloud comprises rendering each of the media content attributes in a font characteristic indicative of its associated weighting factor.

4. The method of claim 3, wherein the font characteristic is font size, and wherein each of the media content attributes is rendered in a font size proportional to its associated weighting factor.

5. The method of claim 4 further comprising:
receiving a user indication to resize one of the media content attributes, wherein the user indication includes a scale factor;
rendering the one of the media content attributes in a font size proportional to the scale factor; and
updating the weighting factor associated with the one of the media content attributes based on the scale factor.

6. The method of claim 5 further comprising reducing the font size of another one of the media content attributes based on the scale factor.

7. The method of claim 1 further comprising:
searching a plurality of media listings to identify media content that matches one or more of the media content attributes within the user preference tag cloud; and
generating for display, on the display screen, at least one of the plurality of media listings that corresponds to the identified media content.

8. The method of claim 1 further comprising:
receiving a user indication to add or remove one of the media content attributes from the user preference tag cloud;
modifying the user preference tag cloud in response to the user indication; and
updating the user profile information based on the user indication.

9. The method of claim 8 further comprising:
automatically searching, in response to the user indication, a plurality of media listings to identify media content that matches one or more of the media content attributes within the modified user preference tag cloud; and
generating for display at least one the plurality of media listings that corresponds to the identified media content in a display screen.

10. A system for presenting user profile information, the system comprising:
a database configured to store the user profile information; and a processor configured to retrieve the user profile information from the database, wherein the user profile information includes media content attributes;
automatically select a stencil from a plurality of stencils based on the user profile information, wherein the stencil defines a shape and a size of a text area; and
generate for display, on a display screen, a user preference tag cloud comprising the media content attributes, wherein the media content attributes are arranged within the text area based on the shape and the size of the text area of the automatically selected stencil.

11. The system of claim 10, wherein each of the media content attributes has an associated media content category, and wherein the processor is configured to generate the user preference tag cloud by rendering each of the media content attributes in a font characteristic indicative of its associated media content category.

12. The system of claim 10, wherein each of the media content attributes has an associated weighting factor indicating an importance of the given media content attribute to a user, and wherein the processor is configured to generate the user preference tag cloud by rendering each of the media content attributes in a font characteristic indicative of its associated weighting factor.

13. The system of claim 12, wherein the font characteristic is font size, and wherein each of the media content attributes is rendered in a font size proportional to its associated weighting factor.

14. The system of claim 13, wherein the processor is further configured to:
receive a user indication to resize one of the media content attributes, wherein the user indication includes a scale factor;
render the one of the media content attributes in a font size proportional to the scale factor; and
update the weighting factor associated with the one of the media content attributes based on the scale factor.

15. The system of claim 14, wherein the processor is further configured to reduce the font size of another one of the media content attributes based on the scale factor.

16. The system of claim 10, wherein the processor is further configured to:
search a plurality of media listings to identify media content that matches one or more of the media content attributes within the user preference tag cloud; and
generate for display at least one the plurality of media listings that corresponds to the identified media content in a display screen.

17. The system of claim 10, wherein the processor is further configured to:
receive a user indication to add or remove one of the media content attributes from the user preference tag cloud;
modify the user preference tag cloud in response to the user indication; and
update the user profile information based on the user indication.

18. The system of claim 17, wherein the processor is further configured to:
automatically search, in response to the user indication, a plurality of media listings to identify media content that matches one or more of the media content attributes within the modified user preference tag cloud; and
generate for display, on the display screen, at least one the plurality of media listings that corresponds to the identified media content.

* * * * *